United States Patent [19]

Müller

[11] Patent Number: 6,089,605
[45] Date of Patent: Jul. 18, 2000

[54] DEVICE FOR TIGHTENING A SEAT BELT IN A MOTOR VEHICLE

[75] Inventor: Olaf Müller, Rüsselsheim, Germany

[73] Assignee: INOVA GmbH Technische Entwicklungen, Rüsselsheim, Germany

[21] Appl. No.: 08/946,579

[22] Filed: Oct. 7, 1997

[30] Foreign Application Priority Data

| Oct. 7, 1996 | [DE] | Germany | 196 41 224 |
| Feb. 27, 1997 | [DE] | Germany | 197 07 998 |
| Sep. 4, 1997 | [DE] | Germany | 197 38 727 |

[51] Int. Cl.$^7$ .................................................. B60R 22/36

[52] U.S. Cl. ............................................................ 280/806

[58] Field of Search ............................................... 280/806

[56] References Cited

U.S. PATENT DOCUMENTS

| 5,364,129 | 11/1994 | Collins et al. | 280/806 |
| 5,480,190 | 1/1996 | Föhl | 280/806 |
| 5,588,677 | 12/1996 | Kopetzky et al. | 280/806 |
| 5,681,004 | 10/1997 | Specht | 280/806 |

*Primary Examiner*—Kenneth R. Rice
*Attorney, Agent, or Firm*—Evenson, McKeown, Edwards & Lenahan, P.L.L.C.

[57] ABSTRACT

A drive device includes a piston guided linearly in at least one pressure tube. The drive for the piston includes a plurality of pyrotechnic drive cartridges ignitable in succession, and is especially useful for tightening a seat belt in a motor vehicle. The linear movement of the piston, urged as a result of an initial ignition, triggers subsequent ignitions for driving the piston. The drive cartridges are ignited in succession.

53 Claims, 30 Drawing Sheets

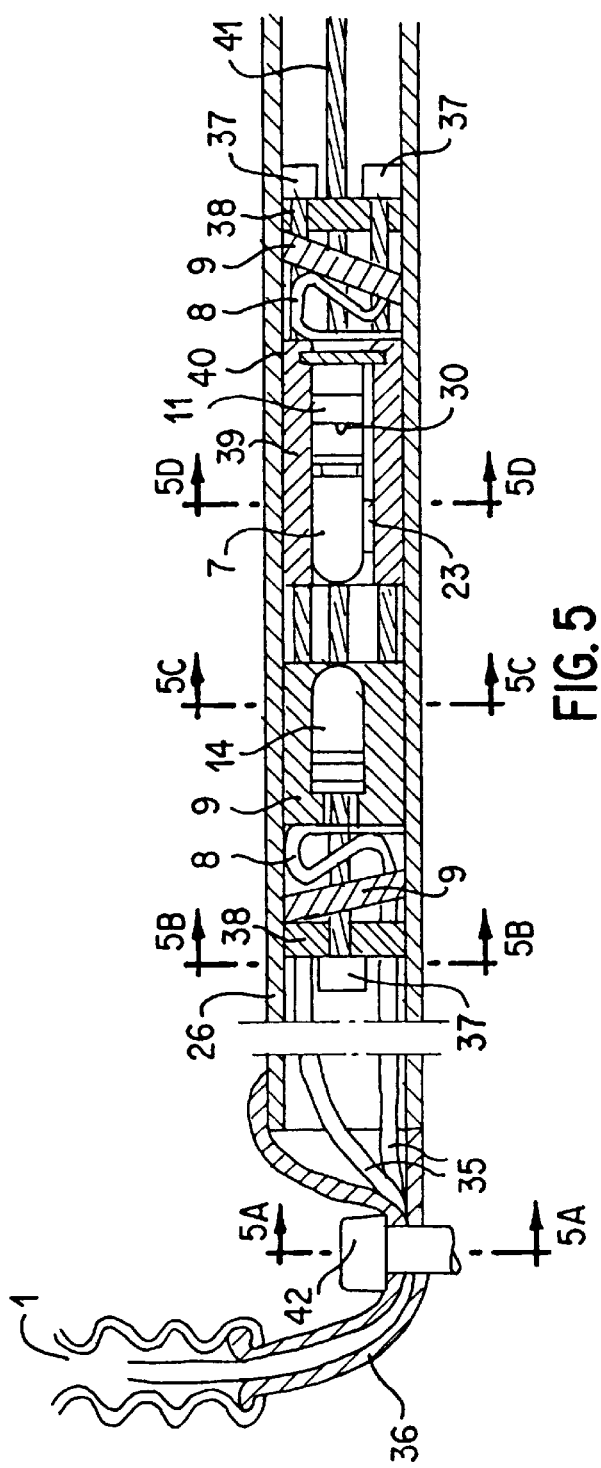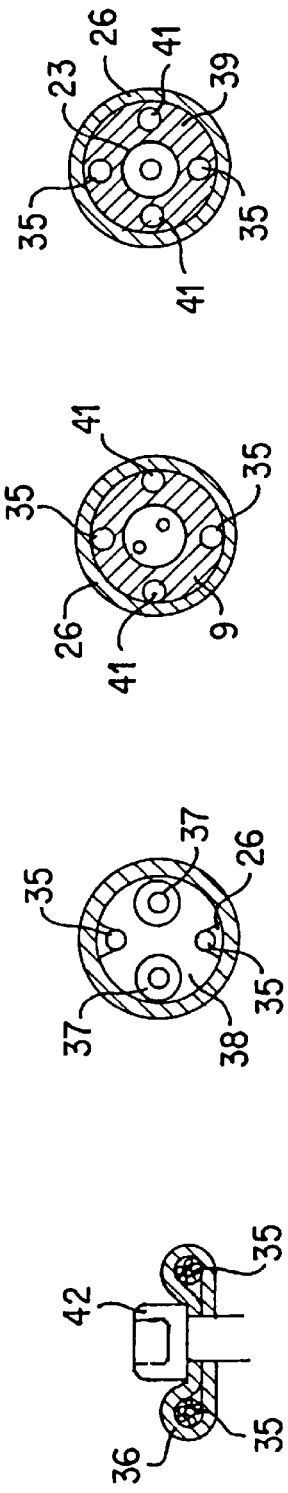

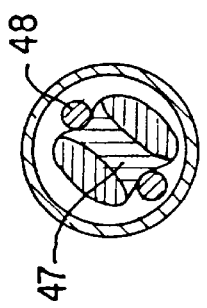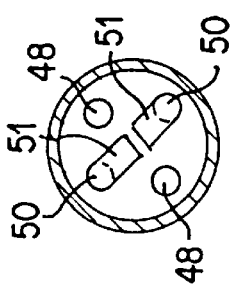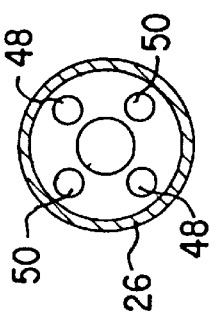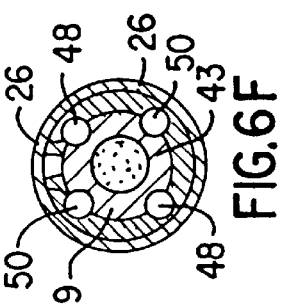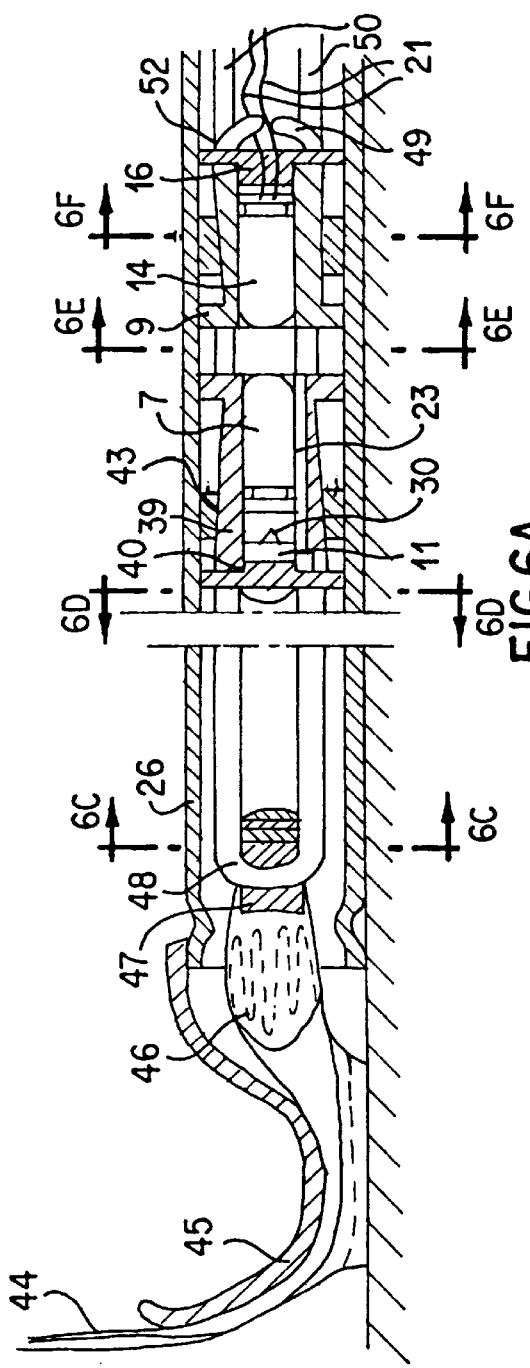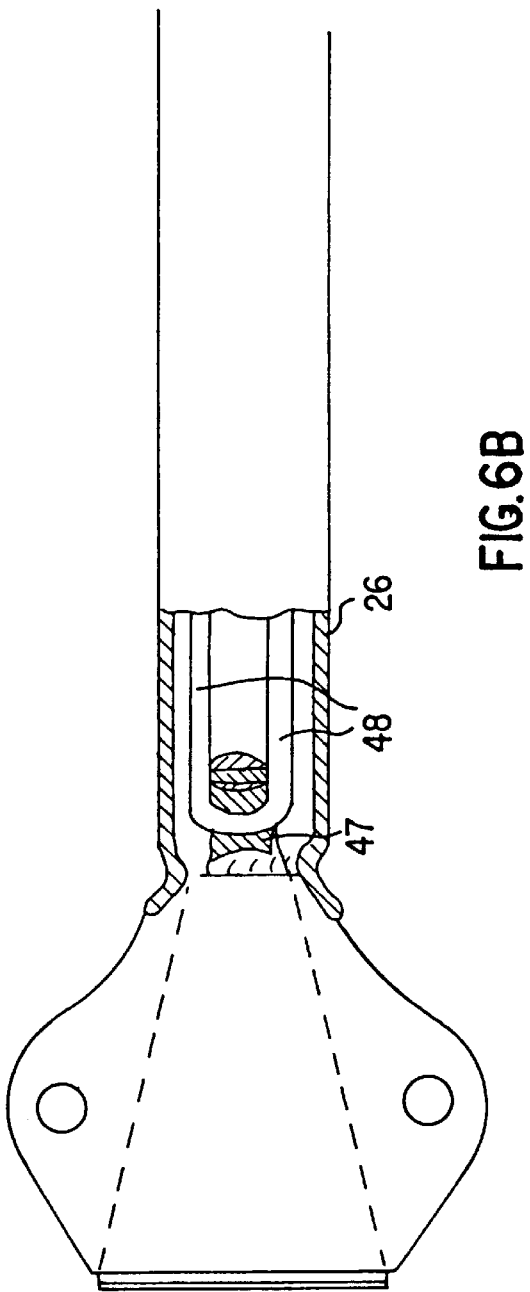

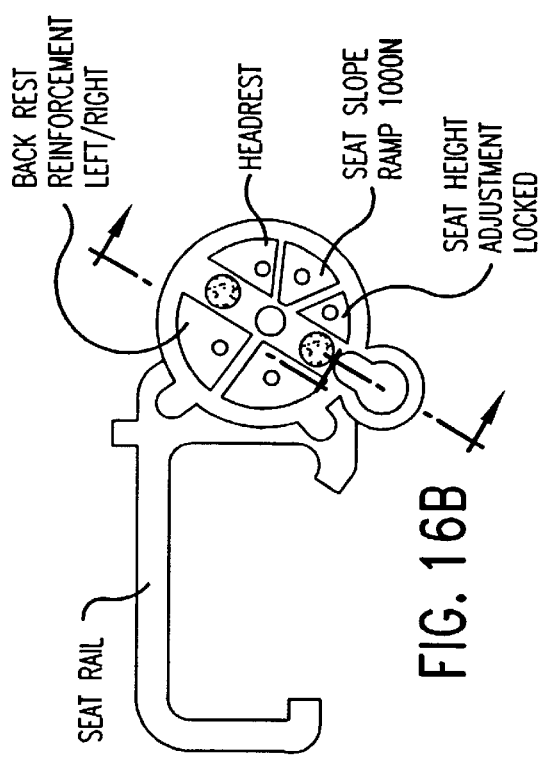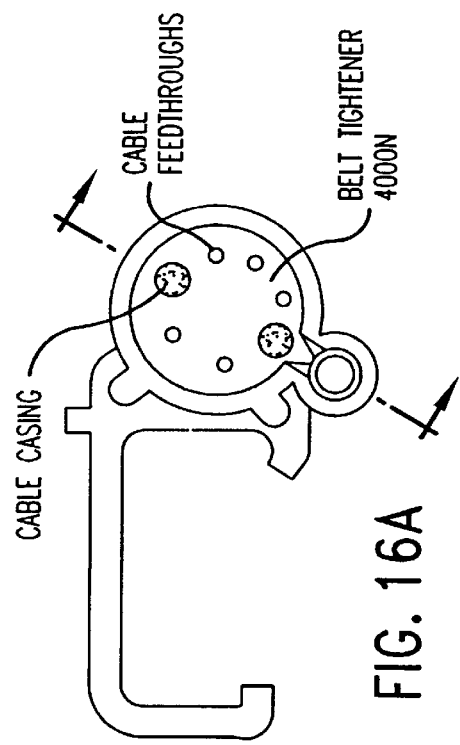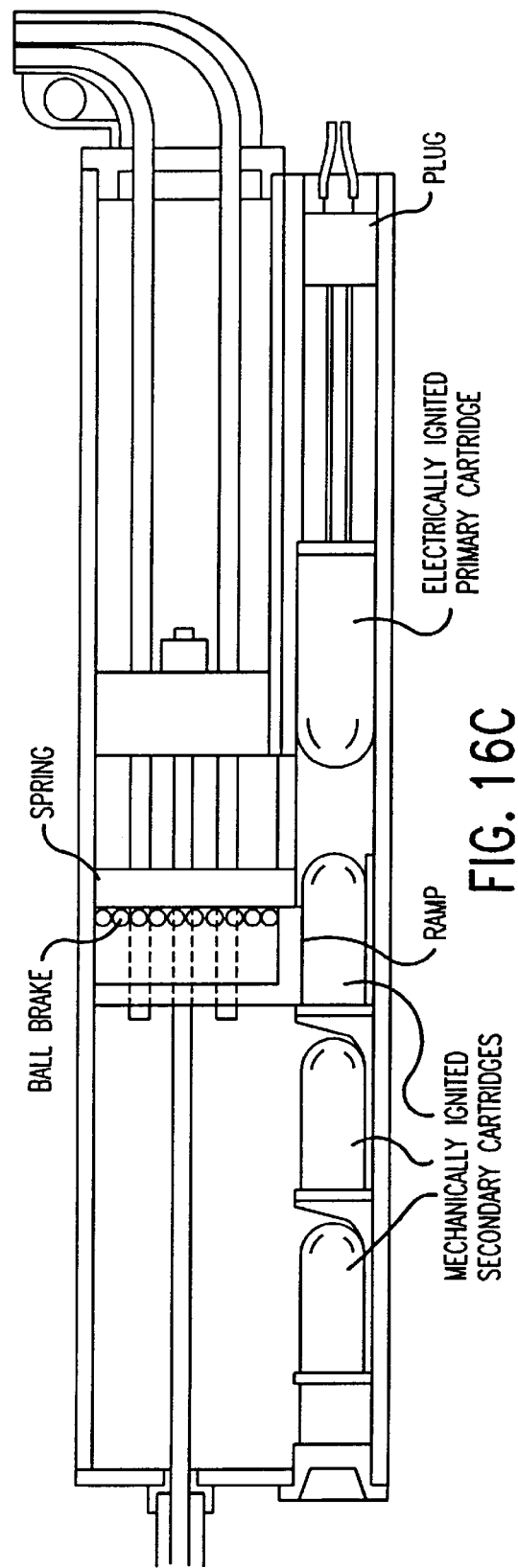

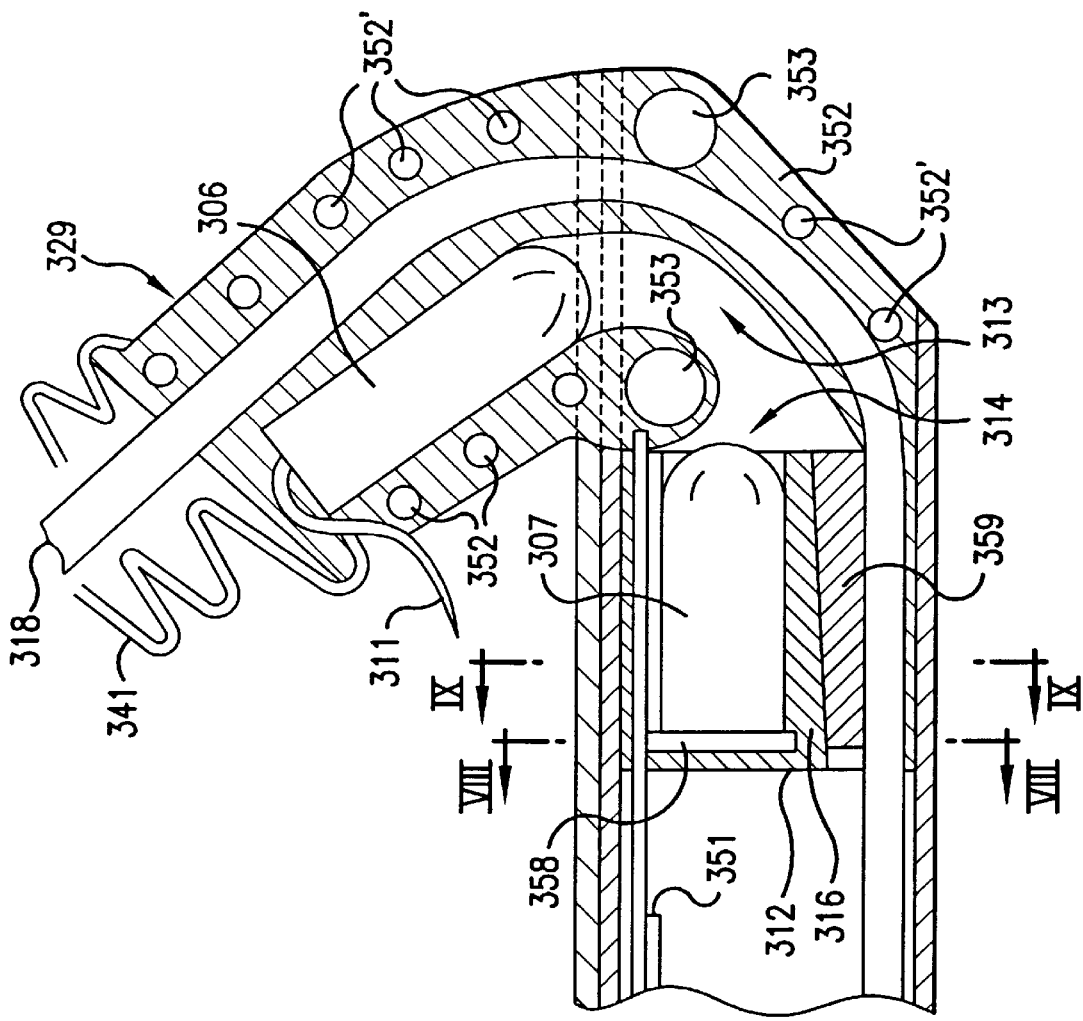
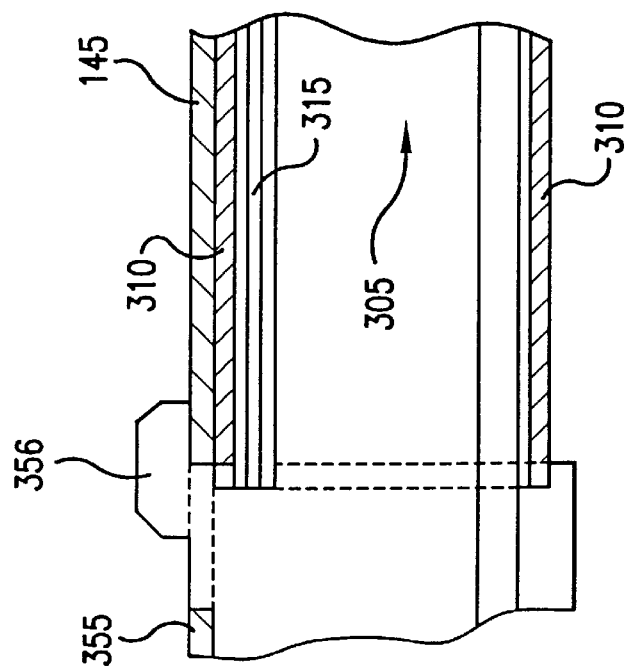
FIG. 22A

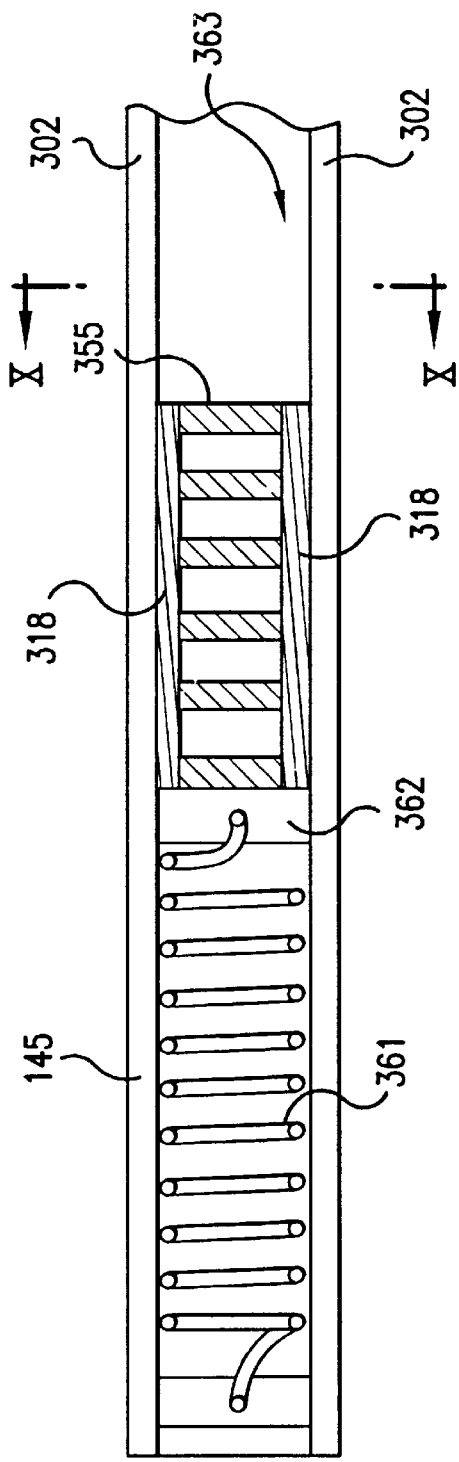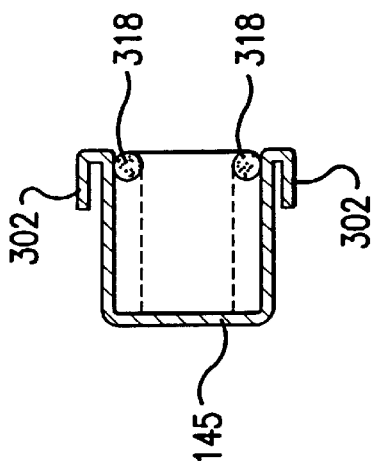
FIG. 23A
FIG. 23B

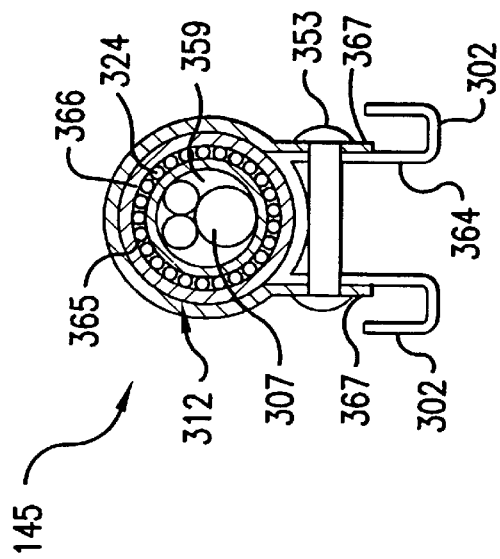
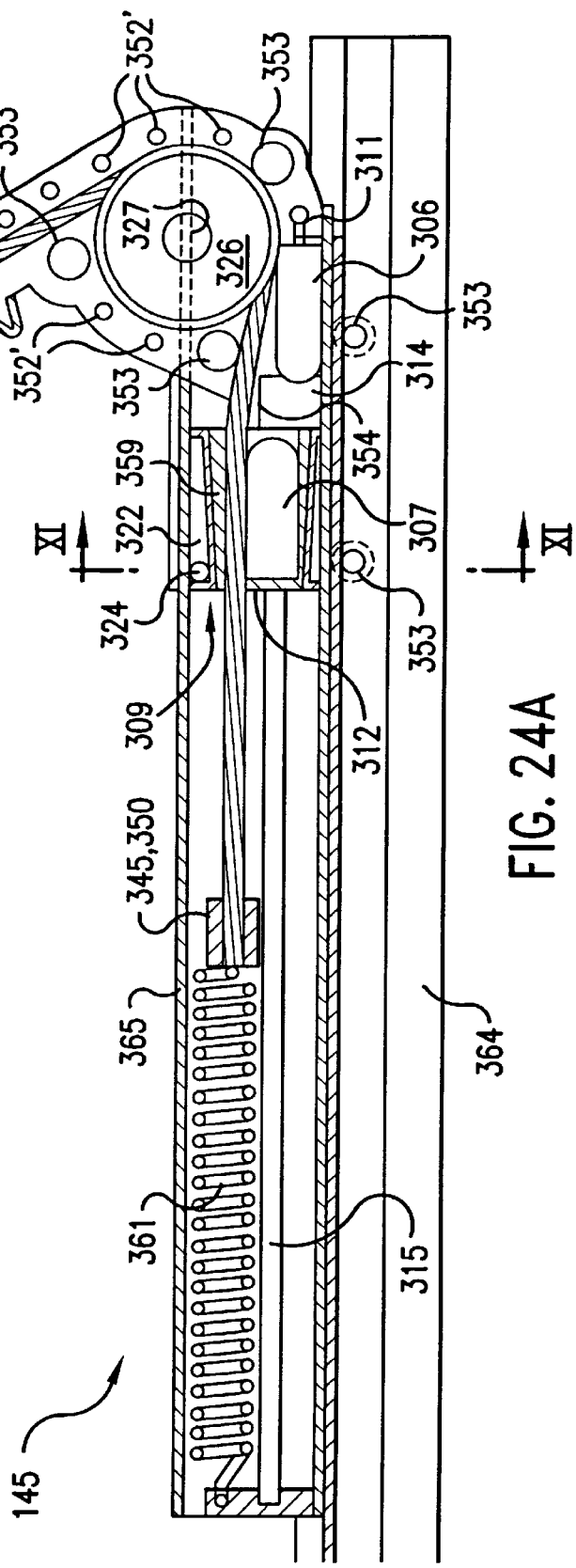
FIG. 24A
FIG. 24B

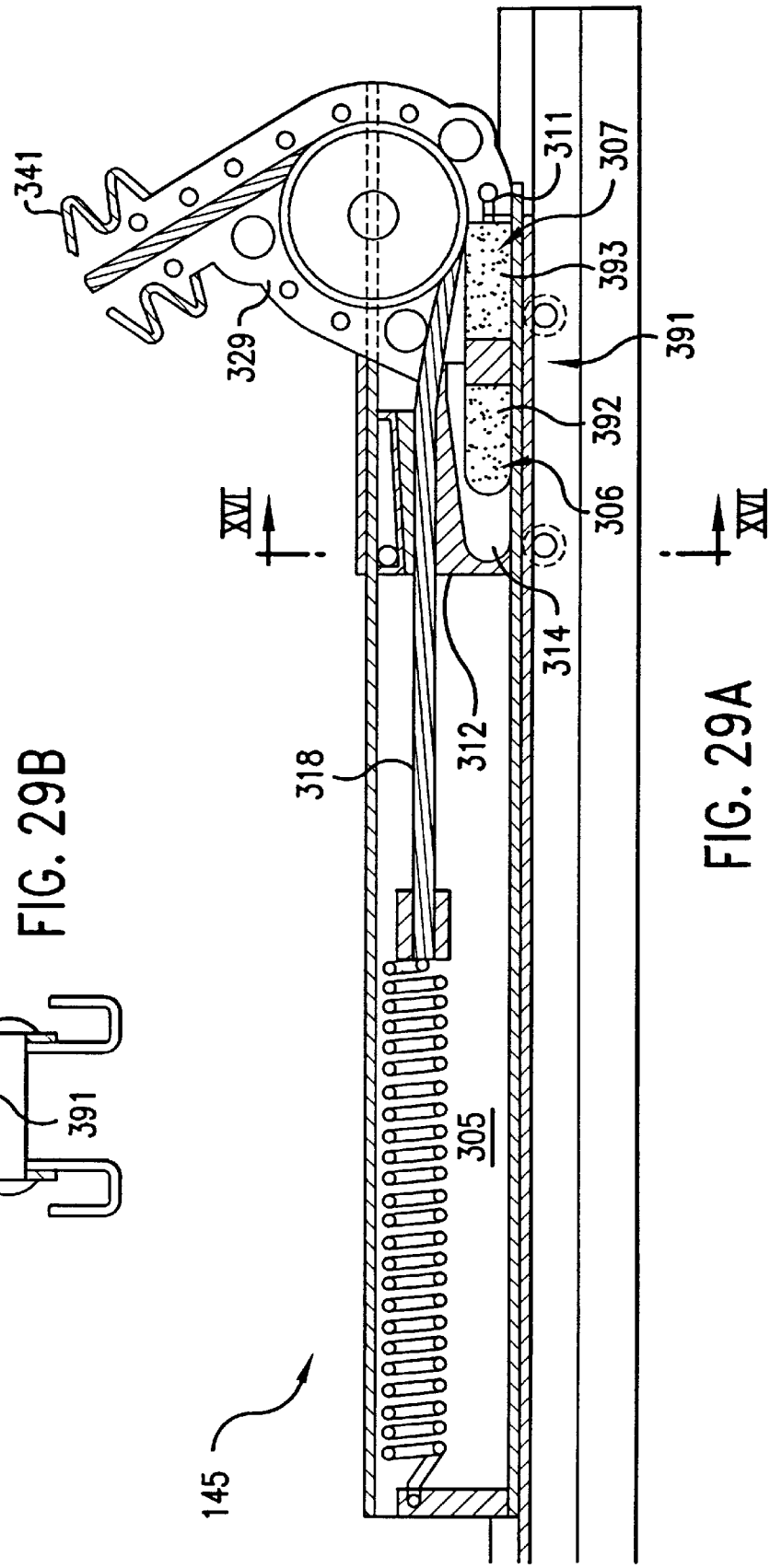

DEVICE FOR TIGHTENING A SEAT BELT IN A MOTOR VEHICLE

BACKGROUND OF THE INVENTION

This invention relates to a drive device with a piston drive guided linearly in a pressure tube. The piston drive comprises a plurality of pyrotechnic piston drive elements ignitable sequentially and is especially useful for tightening a seat belt in a motor vehicle.

SUMMARY OF THE INVENTION

The goal of the invention is to provide a drive device of this type in which multiple successive ignitions of the pyrotechnic piston drive elements, or drive means, takes place automatically following initial ignition.

This goal is achieved according to the invention by making the drive device triggerable in several stages. This is made possible by multistage power-storing devices and/or igniting devices or a plurality of power-storing devices and/or igniting devices. Successive triggering of individual stages can be controlled chemically, mechanically, or electrically.

Mechanical control can be implemented as a result of the linear movement of a piston driven by initial ignition which triggers consequent ignition of the successively ignitable piston drive means.

This can also be effected since, as a result of the linear movement of the piston, pressure channels are successively exposed through which subsequent ignition of drive means can be triggered by pressure igniters influenced by the pressure of the driven piston. Whenever the piston has traveled a certain distance, a new pressure channel is exposed through which the pressure igniter of the next pyrotechnic piston drive means, preferably in the form of a cartridge filled with ignitable propellant, is ignited, by the driving pressure acting on the piston. The piston is moved forward continuously by the propellant gas pressure generated by each of the subsequent ignitions. In this manner, with the aid of propellant charges provided in small quantities in the individual cartridges, a relatively long driving distance is obtained. As a result, it is also possible to set a specific characteristic curve for the driving forces.

In addition to triggering subsequent ignitions by using igniters that are influenced by pressure, it is also possible to provide a mechanical triggering device that moves together with the linear piston drive and triggers the subsequent ignitions of the cartridges in a mechanical fashion, especially by using rim fire igniters.

Preferably, electrical ignition of the propellant that initially acts on the piston drive is used as the initial ignition. The piston drive can consist of a single piston guided linearly in a pressure tube. However, it is also possible to use two pistons drivable in opposite directions, especially toward the two ends of the tube. Tensioning means are connected with the two pistons. The tensioning means are brought out from the interior of the pressure tube through the other piston in each case.

The tensioning means connected with the individual pistons or the two pistons can be connected with any desired components of a seat belt restraint system. The belt buckle of the seat belt can be the means that act on the end stop of the seat belt or the means that act on the winding shaft of a belt retractor. Other components in the vehicle interior can also be moved by the piston drive, for example vehicle seats, the steering column (steering wheel), parts of the foot pedal assembly, and the like.

Preferably, when a single piston is used for the drive device, the piston is connected directly to the belt buckle of a seat belt. Then, in a preferred fashion, the retainer in the form of a sheet metal strip (the lower buckle plate for example), retaining cables, and the like can be connected. During the tightening movement, the drive piston and the retaining device connected directly therewith for the buckle as well as the buckle itself perform movements in essentially the same direction. In other words the buckle fastening and the buckle move in the same direction as the drive piston of the tightening device. In this manner, the driving movement of the drive device is effectively transmitted to the belt buckle and is achieved without deflection, as is provided in conventional devices.

Preferably, the pressure tube with the chambers for the pyrotechnic propellants located therein, which are contained in a shaft, can be made from an extrusion-molded section.

In a drive in which two pistons are used, a pyrotechnic drive means can be provided in each of the two pistons, with one piston being triggered first electrically and the propellant for the other piston the n being triggered by pressure that causes it to ignite, using the driving pressure acting on the first piston.

The pyrotechnic propellant, in the form of cartridges, can be provided in an additional shaft or in a plurality of additional shafts that run parallel to the working channel in each pressure tube. An additional shaft can also be provided, containing the pyrotechnic propellants for a plurality of drive channels located parallel thereto in which pistons are moved. In particular, four drive channels can be provided, including a central shaft with pyrotechnic propellant located therein. The shaft for the pyrotechnic propellant is then in the center and the drive channels with the piston drives are located at 90° intervals around the shaft containing the propellant.

The arrangement of two or more parallel working chambers in which the piston drives, especially double-piston drives, are guided can constitute a central energy device by which a plurality of components connected to the piston drive, especially components of seat belt systems in the vehicle, can be moved. As a result, the central energy device can be placed at a suitable location in the motor vehicle, remote from the components to be moved. One suitable form of connection consists of Bowden cables. As a result, a tubular retaining device for the part, the belt buckle for example, can be connected with a Bowden cable by squeezing the cable in a tubular element of the retaining device. The tubular retaining device can be guided in a tubular guide device during the driving movement. In the case of a belt buckle to be retracted in a seat belt system, the tubular guide device with the retaining device guided therein can be mounted at the vehicle seat or vehicle tunnel. The tubular retaining device can also have a return lock in the area located inside the tubular guide device. This lock can be designed in suitable fashion as a conical surface molded on the tubular retaining device, between which surface and the inside wall of the tubular guide device, clamping bodies, in the form of balls, balls mounted on rings (ball-rings), or flexible, especially slotted, clamping rings for example, are provided. During the driving movement, especially the tightening movement, the tubular retaining device with the element fastened thereto, especially the belt buckle, is pulled into the guide tube. The return lock prevents movement in the opposite direction so that the tightened element remains in this position.

The connection of the element to be moved, a seat belt for example, in the vicinity of its end stop or of a seat belt buckle, can be provided by webbing. The reverse braking or return locking function can then be provided by a clamping device mounted outside the piston drive on the vehicle body, especially in the vicinity of a vehicle pillar. The clamping device can then advantageously be designed so that during normal operation it acts as an end stop for a seat belt in a seat belt system. The clamping device is in frictional contact with the webbing during normal operation. Upon tightening, this frictional contact is preferably automatically released and then automatically restored by the return locking function. For this purpose, the clamping device can have two clamping elements located on either side of the webbing, with at least one of the two clamping elements having the shape of a wedge.

For connecting a tensioning cable to a rotating element, a coupling can be provided. Preferably, the coupling has two coupling elements in the form of rings. An internal coupling element is permanently connected with the rotating element, especially a winding shaft of a belt retractor. The other, outer coupling element is connected with the tensioning cable of the piston drive. The outer coupling element can have an inside radius larger than the outside radius of the internal coupling element, so that both coupling elements are disengaged from one another during normal operation. For this purpose, the outer coupling element can be connected by locking means, such as pins (shear pins) for example, with the belt retractor housing holding it in place. During tightening, the locking means are released. If shear pins are used, the pins are sheared and the outer coupling element is brought into engagement with the inner coupling element by the tension acting on it. Both coupling elements can have suitably shaped toothed rings for this purpose. During the tightening movement, the inner toothed ring of the outer coupling element remains in toothed engagement with the inner toothed ring over a certain angle range. Consequently, the movement of the tensioning cable is transmitted as a rotary motion to the winding shaft. When the tightening process is complete, the outer coupling element is loose with respect to the inner coupling element, so that the winding shaft can be turned in a belt retractor.

The invention also provides a drive device especially for tightening a seat belt in a motor vehicle. At least one power-storing device and/or at least one drive device is mounted within or flanged to at least one top rail for a vehicle seat.

Provision can be made such that two drive devices, preferably operating in opposite directions, are located inside or on a top rail and in particular are capable of being urged by a common power-storing device. Advantageously, the same power-storing devices are used for both drive devices, and both drive devices use the same top rail as their path of movement, so that the length of the top rail is utilized optimally. Finally, the advantages are achieved in that more space, weight, and expense are saved, with increased safety.

Preferably the at least one top rail has an interior space or an interior space section that is at least approximately rectangular or angular in cross section, or is at least approximately round or oval, for receiving at least one power-storing device and/or at least one drive device.

A top rail used according to the invention as a housing for a drive device can be designed to be received adjustably partially, and preferably at least approximately completely, inside a vehicle body. This offers the advantage that the corresponding bottom rail also contributes to the stability of the top rail, so that the top rail is not forced to act alone in receiving the energy from the at least one power-storing device and/or the at least one drive device. Every combination of bottom rail and top rail, in the most favorable case in which a top rail runs at least approximately completely inside the bottom rail, constitutes a double-walled housing for the at least one power-storing device and/or the at least one drive device. Thus, a top rail, in order to be able to receive in a functionally reliable fashion the at least one power-storing device and/or the at least one drive device, does not itself have to be additionally stabilized by increased wall thickness or a stabilizing shape. The top rail instead can continue to be used in already existing designs without a drive device necessarily being damaged, especially when a power-storing device is triggered or a drive device is actuated in such fashion that the function of the power-storing device and/or the drive device is adversely affected.

In one preferred improvement, provision is made such that the at least one drive device has one or more pistons.

According to another preferred design of the drive device according to the invention, in conjunction with a seat part that is adjustable with respect to the top rail or rails and in particular is height-adjustable or pivotable, force and movement transmission devices, couplable after triggering with the at least one drive device, are provided for transmission of force and movement from at least one drive device to a safety device fixed with respect to the seat part. Such a seat part may, for example, be a belt buckle, a headrest, a forward edge of the seat part that can be raised, an operable cushion support in the vicinity of the front half of the seat part, or a seat back support. As a result, the invention can also be used for suitably adjustable seats or more specifically for seat (bottom) parts with the advantage of a compact and functionally reliable design.

The embodiments explained above can be advantageously improved by virtue of the fast that the devices that transfer the force and movement contain tensioning devices, especially a tensioning cable. The piston is made in several parts, with the tensioning devises being guided displaceably between the piston parts as long as the piston is not being urged by a power-storing device. The piston parts hold the tensioning devices between then following their urging by a power-storing device, initially at least forcewise and preferably also shapewise. Such holding is performed preferably by employing a wedge that jams the cable(s) after the pressure of the pyrotechnic cartridge has been triggered. Such a design is characterized by simple construction and high functional reliability, and can be improved for example by having pretensioning devices urge the tensioning devices into a position that corresponds to the lowest seat position of the height-adjustable vehicle seat. The latter measure ensures that the tensioning devices, such as one or more tensioning cables, are always tensioned. This also constitutes an independent invention, especially with any type of belt tightener for height-adjustable seats.

Preferably, provision can also be made such that each power-storing device provides for electrical first ignition or mechanical ignition. A plurality of power-storing devices can be provided. Preferably, a first power-storing device containing an electrical first ignition as well as at least one additional power-storing device having a preferably mechanical ignition are provided so that two additional mechanically triggerable power-storing devices and devices for sequential triggering of the individual ignitions are present.

To avoid unintentional resetting of a safety device or its drive device, which might possibly dangerous for a vehicle occupant, it is also advantageous if the at least one drive device is lockable in a triggered position by means of a return lock. For this purpose, the return lock can include for example a clamping piston, or at least a wedge and/or a ball brake. It is also possible for the at least one drive device to be lockable in terms of its direction of movement on at least one side or all the way around. These designs can also be improved by having the at least one drive device lockable with respect to the corresponding top rail.

Advantageously, a seat-clamping device such as a seat-clamping piston can be provided. The seat-clamping device is drivable by at least one drive device.

An embodiment of the motor vehicle seat according to the invention that is preferred because it is advantageous has at least one power-storing device and/or at least one drive device accommodated in an insert received modulewise in the top rail that serves as a housing for the drive device. The modular design allows the completely assembled or equipped insert to be installed or replaced easily.

In both the motor vehicle seats according to the invention and here as well, it is advantageous for the power-storing device with mechanical triggering to feature redundancy such that two ignitions are triggered simultaneously but independently of one another. As a result, the probability of flawless triggering of the power-storing device and hence of the safety device is significantly increased in an advantageous and simple fashion. This concept is also of independent inventive significance if no multistage ignition is provided.

Embodiments are also preferred in which the top rail that serves as the housing for the drive device consists for example of two parts located behind or above one another. Thus, one part can be a latching block abutted by a top rail part opposite the direction of travel of the vehicle. The part receives the power-storing device and/or the drive device(s). Alternatively, a lower rail part can be combined with a top part that receives the power-storing device and/or the drive device(s). In this way, the available space can be utilized optimally in an efficient design.

Finally, the invention also creates an actuating method for at least one safety function, such as stabilization, especially locking of the heightwise and/or tilt adjustment device for the seat part, raising the front edge of the seat part for adjusting its tilt, additional support of the seat part on the top rail, actuating a cushion support in the vicinity of the forward half of the seat part, tightening a seat belt, supporting the seat back on a seat frame or a seat bottom structure of the seat part and/or on the top rail, adjusting the headrests to a protective or safety position, and triggering and inflating airbag devices that are integrated in particular into the vehicle seat such as side airbag devices for the thorax and/or head. Actuation is performed with a drive device, so that when at least one drive device is actuated by means of at least one preferably pyrotechnic power-storing device, activatable in the event of a crash, force and/or movement transmission devices movable opposite to the drive direction for the safety function are initially coupled by engaging devices to the drive device. The drive device then provides the force and/or movement required for actuating the safety function by means of the force and/or movement transmission devices.

One improvement on the method described above provides that tensioning devices, for example tensioning cables of the force- and/or movement-transmitting devices, are clamped between the parts of a piston contained in the latter to entrain the drive device.

Alternatively or additionally, provision can be made such that the drive device is locked to prevent it from moving backward opposite to the direction in which it is urged by means of the power-storing device(s). Preferably the drive device is locked to prevent any backward movement opposite to the direction in which it is urged by the power-storing device(s) after the urging action is suspended automatically by the power-storing device(s).

For height-adjustable seats with belt buckles attached thereto, it is also preferable for tensioning devices associated with the drive device and coupled or couplable therewith to be pretensioned toward a position that corresponds to the lowermost seat position of the height-adjustable vehicle seat. As a result, the tensioning devices are kept tensioned even when the seat is lowered, which facilitates and improves the engaging function.

Another item of independent significance is the improvement according to the two simultaneous but mutually independent ignitions of a mechanically triggerable power-storing device. The probability of ignition failure is thus drastically reduced.

The drive device can contain a plurality of pistons that can be urged in a variety of directions, especially pairwise in different directions. In addition, another improvement can consist of the fact that pistons that can be urged in various directions are movable in different, preferably parallel planes and are triggerable by the movement of a previously urged piston. Another improvement can consist of the fact that the pistons, in the course of their movement, engage delivery devices common to all the pistons. In this way, an especially compact drive device can be produced in which a linear path of movement of a predetermined length is divided into a plurality of partial lengthwise movement paths that can be accommodated in a small space.

In addition, the invention relates to a method for triggering a drive device in a plurality of stages that can be performed by multistage power-storing devices and/or ignition devices or by a plurality of power-storing devices and/or ignition devices. The successive triggerings of individual stages can be controlled chemically, mechanically, or electrically.

The invention will now be described in greater detail with reference to embodiments shown in the figures.

BRIEF DESCRIPTION OF THE DRAWINGS

FIG. 5 shows an embodiment of a tightening drive with two drive pistons located in a pressure tube, said pistons being moved in opposite directions;

FIG. 6 shows another embodiment of a tightening drive with two pistons located in opposite directions in a pressure tube;

FIGS. 16A 16B and 16C show one lengthwise and two transverse sections through a drive device for a plurality of safety functions;

FIGS. 22A, 22B, and 22C show one lengthwise section and two cross sections through a seventh embodiment of a top rail of a motor vehicle seat, with the cross sections in FIGS. 22B and 22C being made along lines VIII—VIII and IX—IX respectively in FIG. 22A;

FIGS. 23A and 23B show a bottom view and a cross-sectional view of an eighth embodiment of a top rail of a motor vehicle seat, with the cross section in FIG. 23B being made along line X—X in FIG. 23A;

FIGS. 24A and 24B show a lengthwise section and a cross section, respectively, through a ninth embodiment of a top rail of a motor vehicle seat, with the cross section in FIG. 24B being made along line XI—XI in FIG. 24A;

FIGS. 29A and 29B show a lengthwise section and a cross section, respectively, through a variation on the ninth embodiment shown in FIGS. 24A and 24B of a top rail of a motor vehicle seat, with the cross section in FIG. 29B being made along line XVI—XVI in FIG. 29A;

FIGS. 30A to F show another embodiment of a drive device with four pistons, each with a separate movement path, instead of one piston with a single long linear motion path, with FIGS. 30A and 30C being top views of an intermediate plate with drive components mounted thereon, while FIGS. 30B and 30E show a top view and a cross sectional view of the intermediate plate without drive components, and FIGS. 30D and 30F are side views of housing halves of the drive device; FIG. 31C, section L; FIG. 31B, section M; FIG. 31E, section N) through a clamping piston.

DESCRIPTION OF THE PREFERRED EMBODIMENTS

Figure 1:
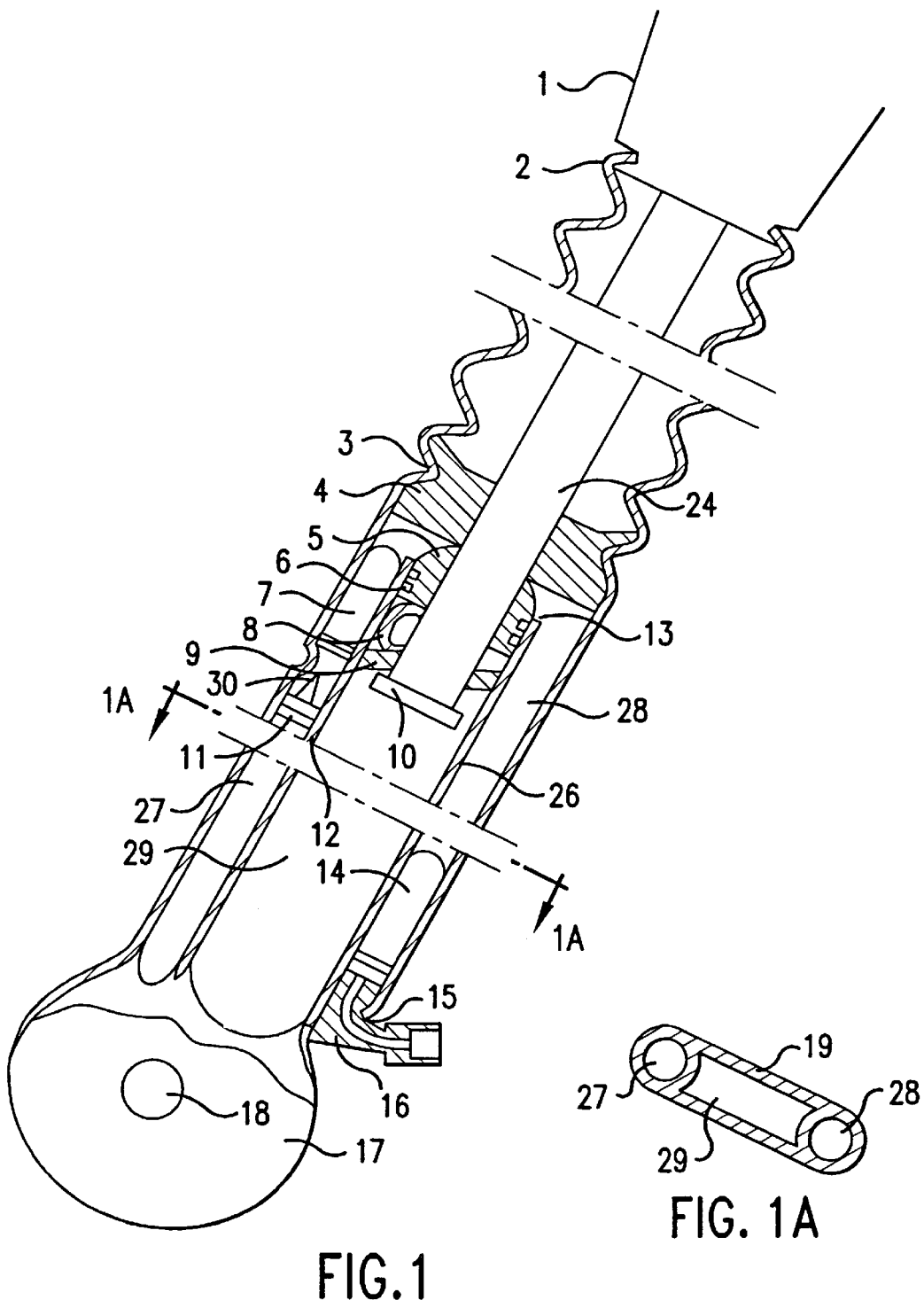
FIG. 1 is an embodiment in which a tightening drive is connected directly to a belt buckle of a seat belt.

In the drawings, throughout all the figures, the same or similar or identically or similarly acting parts or combinations have for the most part been provided throughout with the same reference numbers. As a result, these parts or combinations as well as their functions are apparent to the individual skilled in the art, even in the case of those views in which not all such parts or combinations or their functions are described in detail. In different embodiments, different reference numbers have been used for the same or similarly acting parts or combinations without implying thereby that different functions of these parts or combinations are meant, as the individual skilled in the art can easily recognize. In addition, the individual skilled in the art can learn additional details from the individual illustrations and descriptions of the drawing, especially by comparative examination of different figures, without these being mentioned and/or described in particular.

Furthermore, in the following description of the drawing, general parts and various details of a motor vehicle seat are used as a basis as set forth and described in German Patent Application DE 197 07 998.9, which has a content fully corresponding to the scope of disclosure of the present documents.

In the embodiments shown in FIGS. 1 to 4, a belt buckle 1 is connected directly with piston 5, designed as a tensioning piston, by means of a connecting element which for example can be a piston rod 24, a connecting panel, or a retaining device for the belt buckle. Piston 5 is guided linearly in a working chamber of a pressure tube 26. When piston 5 is urged, piston rod 24 and belt buckle 1 fastened thereto are moved essentially in a straight line in the same direction as piston 5. No cable deflectors or the like are provided. As the sectioned drawing shows (section A—A in FIG. 1A), the pressure tube is made flat and has a flat, approximately rectangular working chamber in which piston 5 moves when urged. In the embodiment shown in FIG. 1, shafts 27 and 28 are provided on both sides of the flat tube profile. The shafts extend parallel to working chamber 29 in the interior of the tube. Shafts 27 and 28 accept ignitable pyrotechnic drive means in the form of cartridges 7 and 14. The pressure tube and molded shafts can be made in the form of an extrusion-molded section 19. Extrusion-molded section 19, as the figures show, is machined at appropriate locations with chip removal and is compressed at the lower end to form a fastening part 17 with a fastening hole 18.

The embodiment shown in FIG. 1 operates as follows:

Triggered by an acceleration sensor, not described in greater detail, the first propellant (cartridge 14) is ignited by an electrical ignition device 16 mounted on a bead 15 on extrusion-molded section 19. As a result of this electrical initial ignition, the propellant gas generated by the propellant (cartridge 14) is conducted through shaft 28 and a bevel 13 to the pressure side of piston 5. The propellant gas pressure causes piston 5 to move downward, passing a pressure opening 12 in pressure tube 26, so that the driving pressure of the propellant gas urging piston 5 is conducted through pressure opening 12 to a striking piston 11. Striking piston 11 is provided with a striker tip 30 that strikes the ignition device of the second propellant (cartridge 7) in shaft 28. In this manner, the second ignition of propellant 7 is performed. The propellant gas flows over the abovementioned bevel to the pressure side of piston 5 in working chamber 29 so that the piston is moved even further downward. This drive movement is transmitted to the belt buckle by piston rod 24. This causes a bellows 22 to be compressed.

To guide piston rod 24, a cylinder head 4 is used. The cylinder head is crimped by a bead 3 on the upper end of extrusion-molded profile 19. The head seals off both shafts 27 and 28 as well as working chamber 29 in pressure tube 26 from the outside.

As a result of the second ignition, not only is elimination of belt slack achieved, but the belt of the individual in the vehicle seat is also tightened. In order for belt buckle 1 to be held in the tightened position, a latching ellipse 9 is provided on piston 5. This latching ellipse 9 is set at an angle during the tightening of belt buckle 1, as shown in FIG. 1. This tilted position is maintained with the aid of a spring 8. In the end position of the tightening process, the free leg of spring 8 tilts latching ellipse 9 in such fashion that it is located crosswise in pressure tube 26 and engages the walls of the pressure tube. In this manner, a return lock is created, possibly with energy absorption.

Figures 2, 2A:
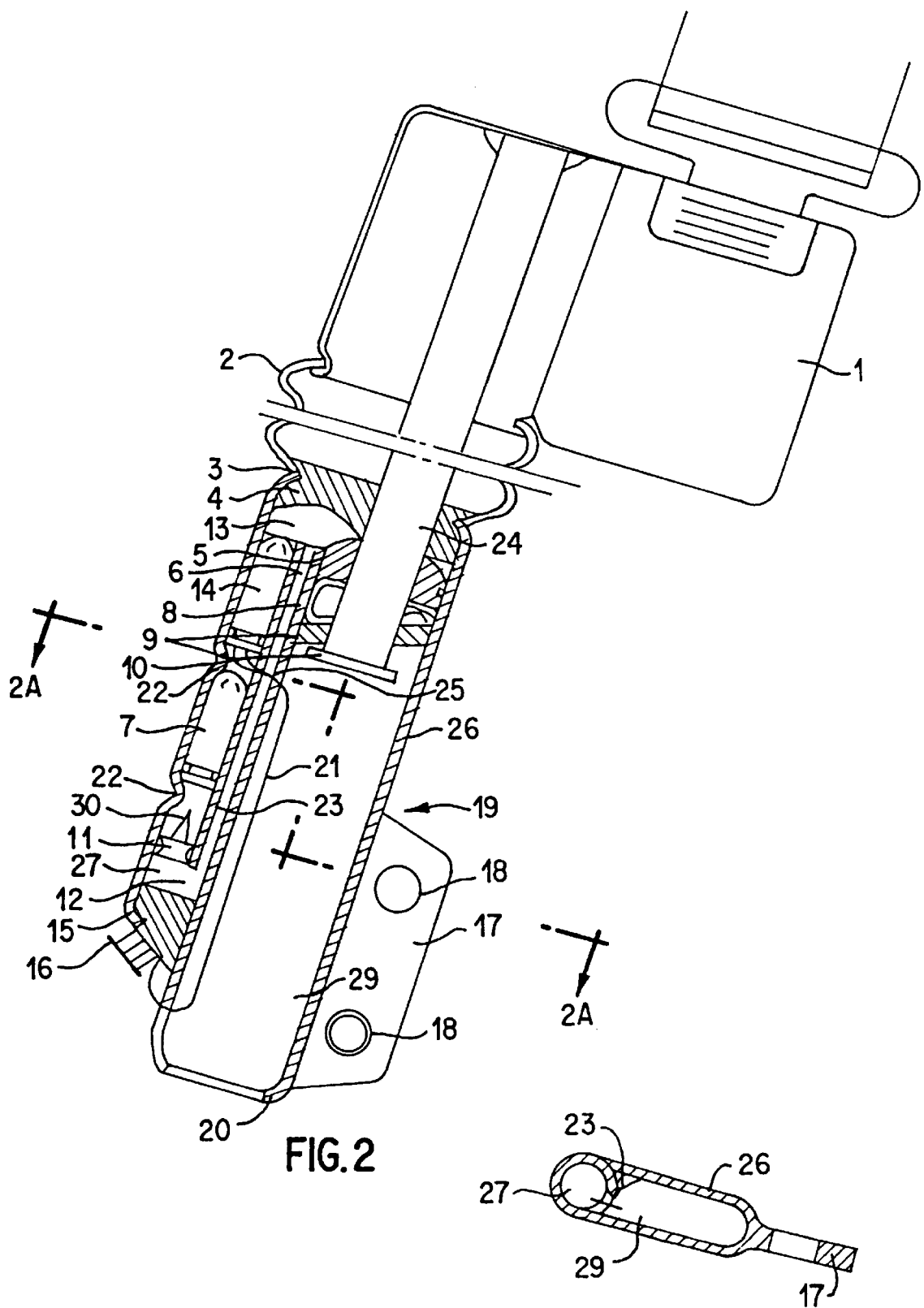
FIG. 2 is another embodiment of a tightening drive that is connected directly to the belt buckle, with limited installation length.

In the embodiment shown in FIG. 2, in cartridges 7 and 14, the two propellant charges are located in a shaft 27 that extends parallel to working chamber 29 of pressure tube 26. Initial ignition of the propellant charge contained in cartridge 14 is likewise performed by an electrical igniting device 16 through an ignition cable 21. The propellant gas pressure that is generated acts through bevel 13 on the pressure side of the piston. A pressure channel 23 is provided for secondary ignition of the propellant charge in cartridge 7, said channel extending from bevel 13 up to striking piston 11 with striker tip 30. The propellant gas pressure released by second cartridge 7 acts on the pressure side of piston 7 through an opening 25. Indentations 23 are provided in shaft 27 to hold the two cartridges 7 and 14 in place.

To limit the stroke, a bead 20 is provided on the underside of pressure tube 26. This bead 20 can also be provided in the embodiment shown in FIG. 1. The embodiment in FIG. 2 also has a return lock in the form of a latching ellipse as in the embodiment shown in FIG. 1.

To limit the installation length, fastener 17 is provided in the form of a lateral rib or lateral connecting flange with mounting openings 18 of extrusion-molded section 19.

Figure 3A:
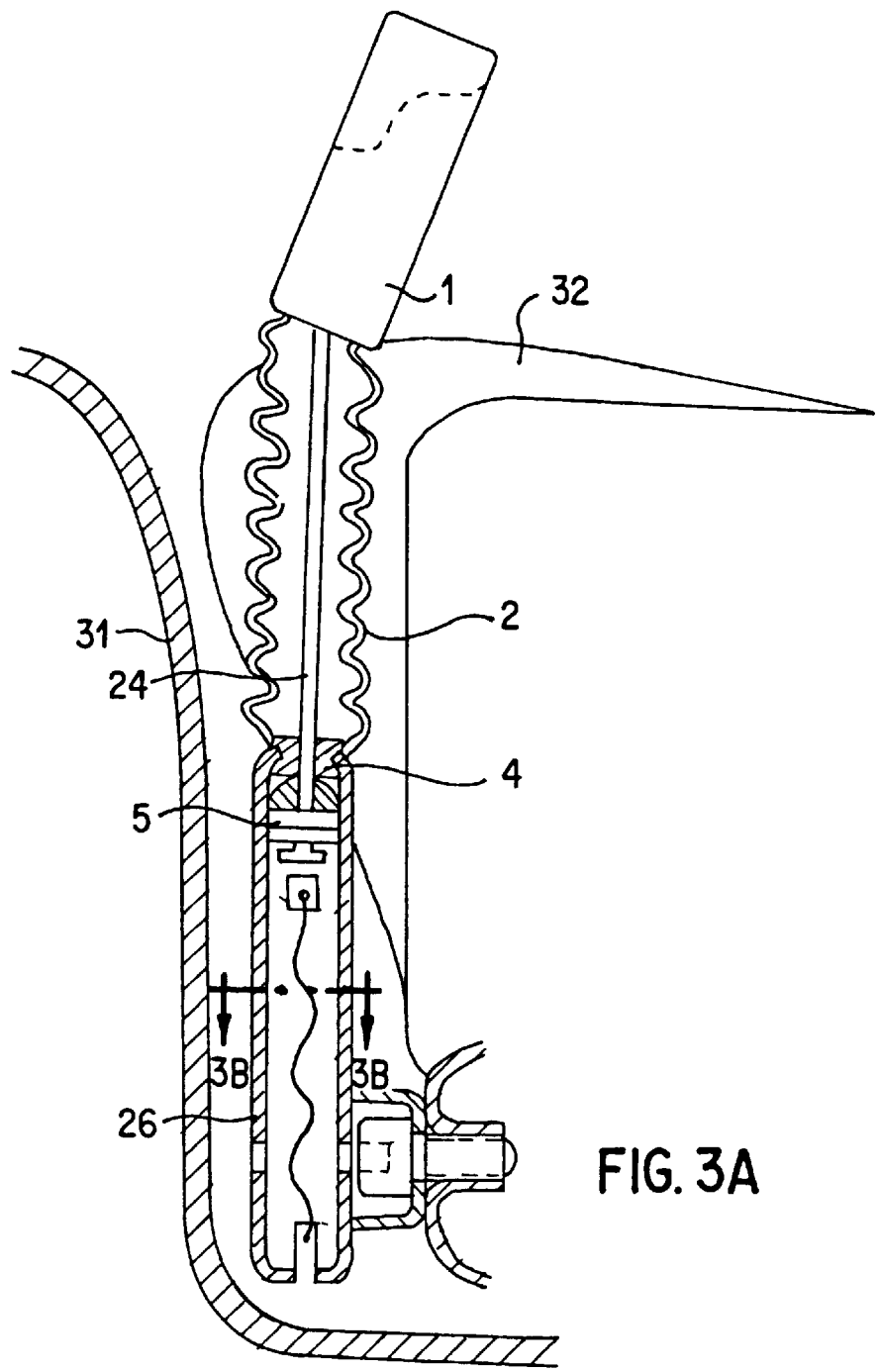
FIG. 3 shows one possible arrangement of the embodiments shown in FIGS. 1 and 2 in the vicinity of the front seat of a motor vehicle.
Figure 3B:
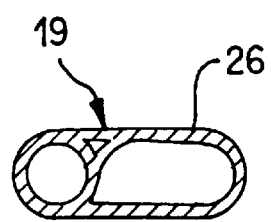
Figure 4:
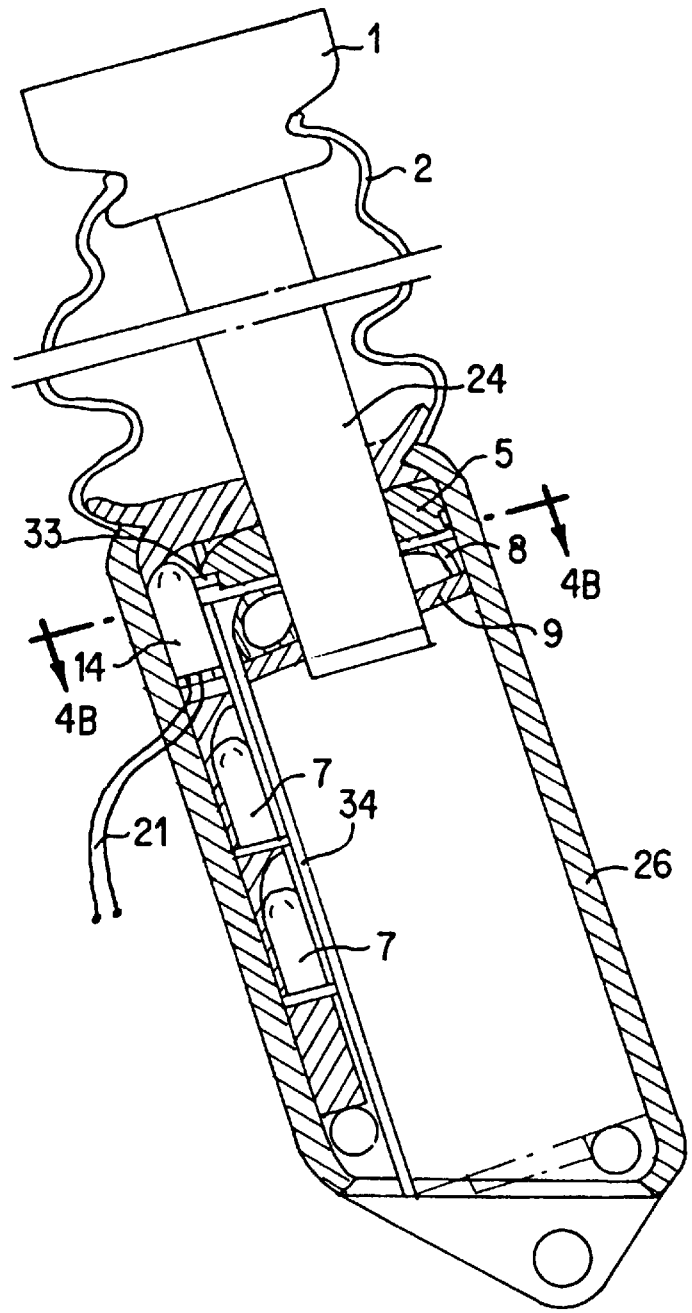
FIG. 4 shows another embodiment of a tightening drive connected directly to a belt buckle.
Figure 4A:
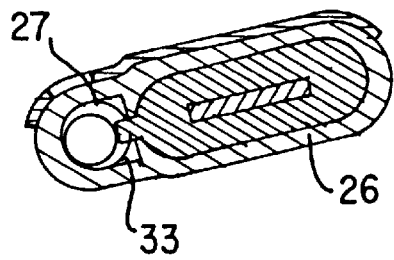

FIG. 3 shows one possible installation of the tightener drive and the belt buckle connected thereto between a vehicle tunnel 31 and a vehicle seat 32. This installation is also suitable for the embodiments shown in FIG. 4 in which a plurality of cartridges containing propellant (three in the embodiment shown) are provided. The two cartridges 7, following initial ignition of cartridge 14, are mechanically ignited during the linear displacement of the piston. For this purpose, piston 5 has an ignition projection 33 that extends through a slot 34 in pressure tube 26. Following electrical initial ignition of cartridge 14 through ignition cable 21, piston 5 is moved downward, whereupon ignition projection 33 mechanically sequentially ignites the propellant charges of cartridge 7, preferably using rim fire igniters. Cartridges 7 and 14 are located one above the other in shaft 27, which extends parallel to the working chamber of pressure tube 26.

The embodiment shown in FIG. 5 shows a drive device especially for tightening two seat belts, in which two drive pistons 9 and 39 are guided linearly in a pressure tube 26. Preferably, tensioning cables 35 and 41, which are connected with the piston, are connected with belt buckles, of which belt buckle 1 is shown. The device is especially suitable for tightening the seat belts of the rear seats of a motor vehicle.

The pyrotechnic propellants for driving pistons 9 and 39 are in the form of cartridges 14 and 7 in pistons 9 and 39. In the case of triggering by an acceleration sensor, not shown in greater detail, it is primarily the propellant charge of cartridge 14 that is ignited, preferably electrically. The pressure wave that the propellant gas produces for driving first piston 9 is transmitted through pressure channel 23 to the back of piston 11 in second piston 39, urging piston 11. A sealing plate 40 is used to seal off a pressure chamber on the back of piston 11 in piston 39. The urged piston possesses a striker tip 30 that strikes the ignition device of cartridge 7. The propellant gas generated also drives piston 39. The driven pistons 9 and 39 move in opposite directions in pressure tube 26. The two pistons 9 and 39 are already moved apart by the generated compressed gas during the initial ignition of the first cartridge 14, whereupon the two seat belts, especially their belt buckles, connected with tension cables 35 and 41, are pulled back with the same force. When second cartridge 7 is ignited, belt tightening under load takes place after the slack in the belt is essentially eliminated by the propellant charge of first cartridge 14.

In order to transfer the movement of the piston to the seat belt to be tightened, tension cables 35 and 41 are connected with said seat belt. As shown at the left side of the drawing in FIG. 5, tensioning cables 35 and 41 are guided through cable deflectors 36 when they emerge from the two ends of pressure tube 26, the deflectors being made of sheet metal, as shown in Section A—A as well. At the same time, cable deflectors 36 can serve to fasten the tightener drive by means of mounting screws 42.

FIG. 6 shows another embodiment of the drive device. In the view in FIG. 6(A), a sectioned view is shown from the side, and in the view in FIG. 6(B) a partially sectioned a top view of the embodiment is shown. As in the embodiment in FIG. 5, this is again a drive device in which two pistons 9 and 39 are driven in opposite directions. Initial ignition of cartridge 14 contained in piston 9 is accomplished by electrical ignition device 16, while secondary ignition of cartridge 7 in second piston 39 is accomplished by pressure ignition, with the driving pressure of the first ignition being transferred through pressure channel 23 to urge piston 11 with striker point 30, as already explained in detail for the previous embodiments.

In this embodiment, the belt buckles, not shown in greater detail, are connected by webbing 44, of which one webbing 44 is shown. Webbing 44 is connected to double rods 48 and 50, which are pulled by the two pistons. The connection is made by a seam 46. Seam 46 is wrapped around one end of a double rod (in the figure, the wrap is made around the end of double rod 48). To reduce the load on the end of the double rod, an adjusting ring 47 is provided between wrapping seam 46 and the end of the double rod (section A—A). Double rod 48 is guided through piston 39 (sections B—B and C—C) and through piston 9 (section D—D). To secure it to piston 9, double rod 48 is bent around to form a rod bead 49 at its two rod ends. The bent rod ends can also be welded for beading. The rod beading 40 abuts a lid 52, through which electrical ignition device 16 is also guided.

A second double rod 50 is also connected with piston 39 by a rod bead 41 on the two rod ends (section B—B). Rod bead 41 for this purpose is located on sealing plate 40 of piston 39. The belt buckle, not shown in greater detail, is connected by webbing 44 to double rod 50, at the right-hand end as shown in the left-hand drawing in FIG. 6.

To guide the webbing, a webbing guide panel 45 is provided that deflects webbing 44 to the belt buckles from the respective double rods 48 and 50.

Clamping rings 43 spring-tensioned on conical outer surfaces of pistons 9 and 39 are provided as return locks. Clamping rings 43 are slotted to allow them to provide tension. The clamping rings are relaxed when the pistons are driven in the tightening direction, and when the pistons return, the rings move to the large-diameter areas of the conical outer surfaces of pistons 9 and 39, jamming the pistons in pressure tube 26 to prevent them from returning.

Figure 7:
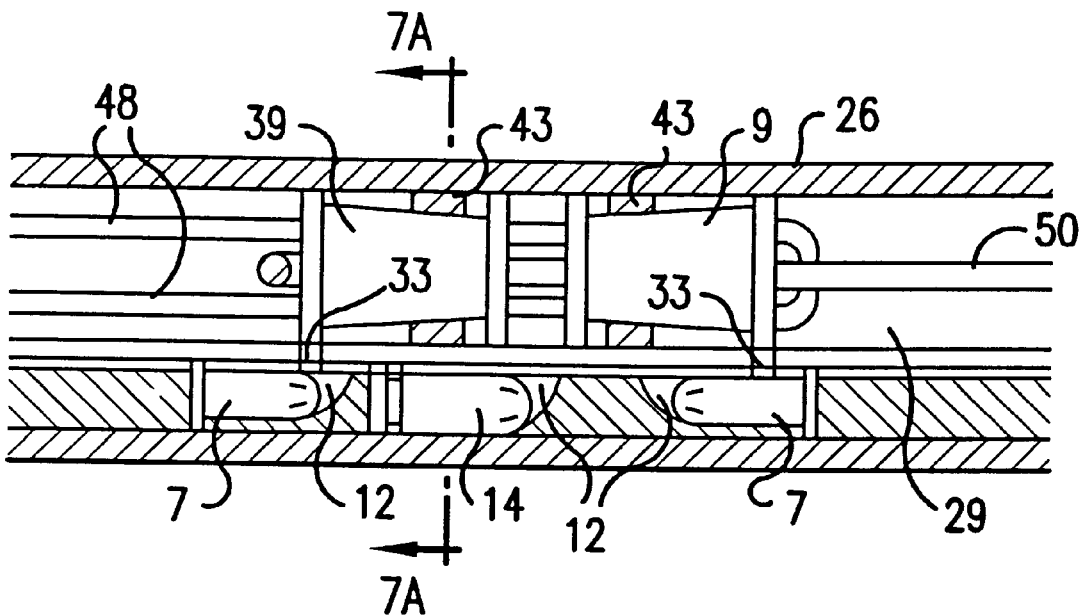
FIG. 7 shows another embodiment of a drive device with two pistons drivable in opposite directions.
Figure 7A:
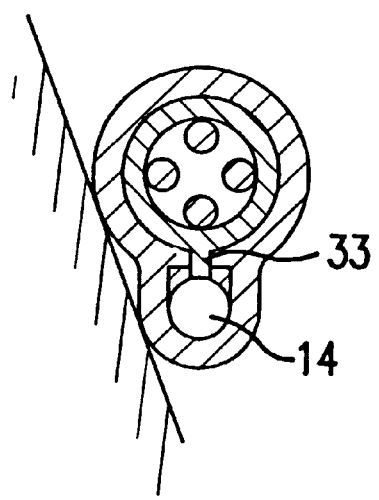

In the embodiment shown in FIG. 7, two pistons 9 and 39 are likewise driven in opposite directions in pressure tube 26. The propellants located in cartridges 7 and 14 are located in chambers next to the working chamber in pressure tube 26. The especially electrically initially ignited cartridge 14 drives the two pistons 9 and 39 in opposite directions, whereupon the subsequent ignitions of cartridges 7 are triggered mechanically, preferably using rim fire igniters, by means of ignition projections 33 molded on pistons 9 and 39, as in the embodiment in FIG. 4. The driving force is transferred to belt buckles, not shown in greater detail, like those shown for example in FIG. 6, by tensioning means designed as double rods 48 and 50. However, the driving force can also be applied by tensioning cables, as in the embodiment in FIG. 5. The propellant gas pressure generated by cartridges 7 and 14 travels from pressure chambers 12 into the respective chambers in which the cartridges are located, and into working chamber 29 in pressure tube 26 on the respective pressure sides of pistons 9 and 39.

Figure 8:
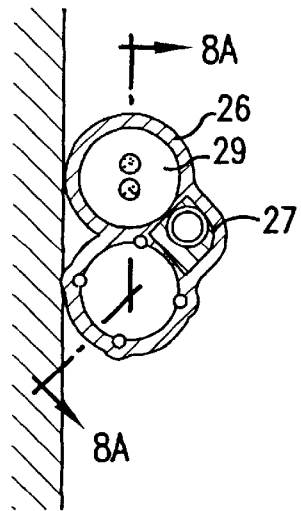
FIG. 8 shows a drive device with piston drives combined in two pressure tubes.

In the embodiment shown in FIG. 8, a double arrangement of pressure tubes 26 is provided. With each containing two pistons 9 and 39 movable in opposite directions therein. FIG. 1 shows an upper pressure tube 26 with two pistons 9 and 39 movable in opposite directions therein, and a lower pressure tube 26 with pistons 9 and 39 drivable in opposite directions therein. As in the embodiments shown in FIGS. 5 to 7, tensioning cables 35 and 41 or double rods 48 and 50 can be connected with drive pistons 9 and 39 to transfer driving forces. As propellants for driving the pistons, a cartridge 14 is provided for initial drive by initial ignition. Additional cartridges 7 are provided for subsequent ignitions. Cartridges 7 and 14 are located in a shaft 27 that extends parallel to working chambers 29 of the two pressure tubes 26. As a result of the double arrangement of pressure tubes 26, a quadruple drive is obtained, since in this case pistons are driven in the two pressure tubes 26. During the initial ignition of cartridges 14, propellant gas is created in pressure chambers 13 in the upper and lower pressure tubes at the respective rear sides of pistons 9 and 39. The propellant gas drives the pistons in opposite directions as already explained with reference to FIGS. 5 to 7. During the linear movements of the pistons, additional propellant located in cartridges 7 is mechanically ignited by igniting projections 33 provided on the pistons with the aid of rim fire igniters, so that the pistons are driven into their end positions to tighten the webbing components.

The driving forces of the pistons can be connected through tensioning cables 35 and 41, which as explained above with reference to FIG. 5, are connected with thickenings 37 on their ends, can be transmitted to the seat belt components. These can be cable couplings through which the tightening forces are transmitted to the winding shafts of retractors. The forces can also be transmitted to end stops or belt buckles, as already explained. The connection to the individual seat belt components can be made with the aid of Bowden cables and the like. Other components to be moved in the vehicle, such as the foot pedals, a steering column, seats, knee guards, and the like, can be connected to the drive device.

Figure 9:
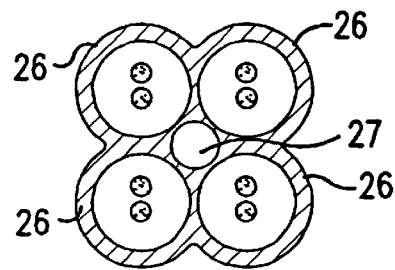
FIG. 9 is a section through a drive device with four pressure tubes in which piston drives are located.
Figure 8A:
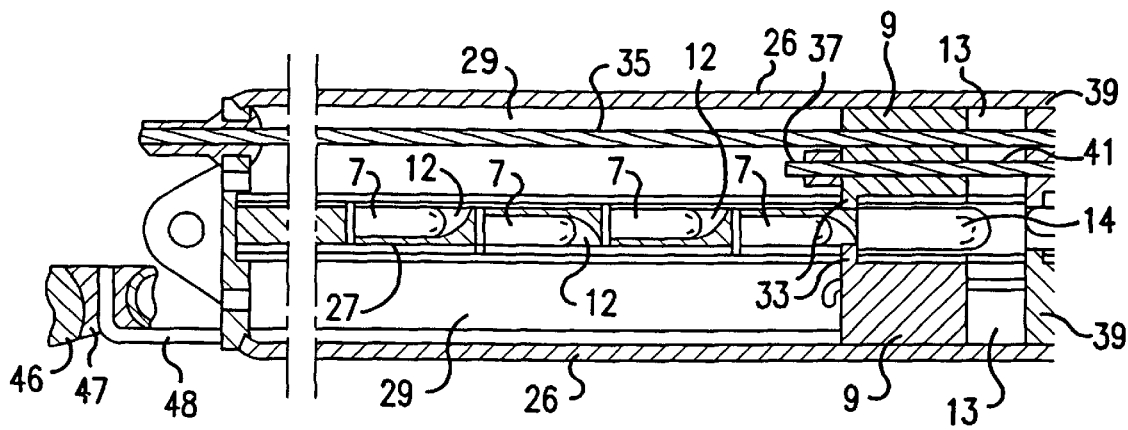

In the embodiment shown in FIG. 9, four pressure tubes 26 are shown sectioned with the respective double piston drives, as described in the embodiments of FIGS. 5 to 7. For igniting the double piston drives in the respective pressure tubes, a cartridge 14 is provided for the initial ignition and additional cartridges 7 are provided for the subsequent ignitions in a common shaft 27, as shown in FIG. 8 for example. Preferably the ignitions take place mechanically with the aid of ignition projections 33 molded on the pistons, preferably by means of rim fire igniters on cartridges 7.

In the embodiments in FIGS. 8 and 9, only a single initial ignition is required for tightening several belt systems, four belt systems for example (FIG. 8) or eight belt systems (FIG. 9). The additional ignitions take place automatically during the linear motion of the respective pistons in pressure tubes 26. In the embodiments in FIGS. 8 and 9, the return locks on the respective components of the belt systems, to which the tensioning forces are transmitted, can be provided as external return locks. They can be provided on the belt retractors or end stops, for example. Clamping jaws that grip the belt can also serve as return locks.

Figure 10:
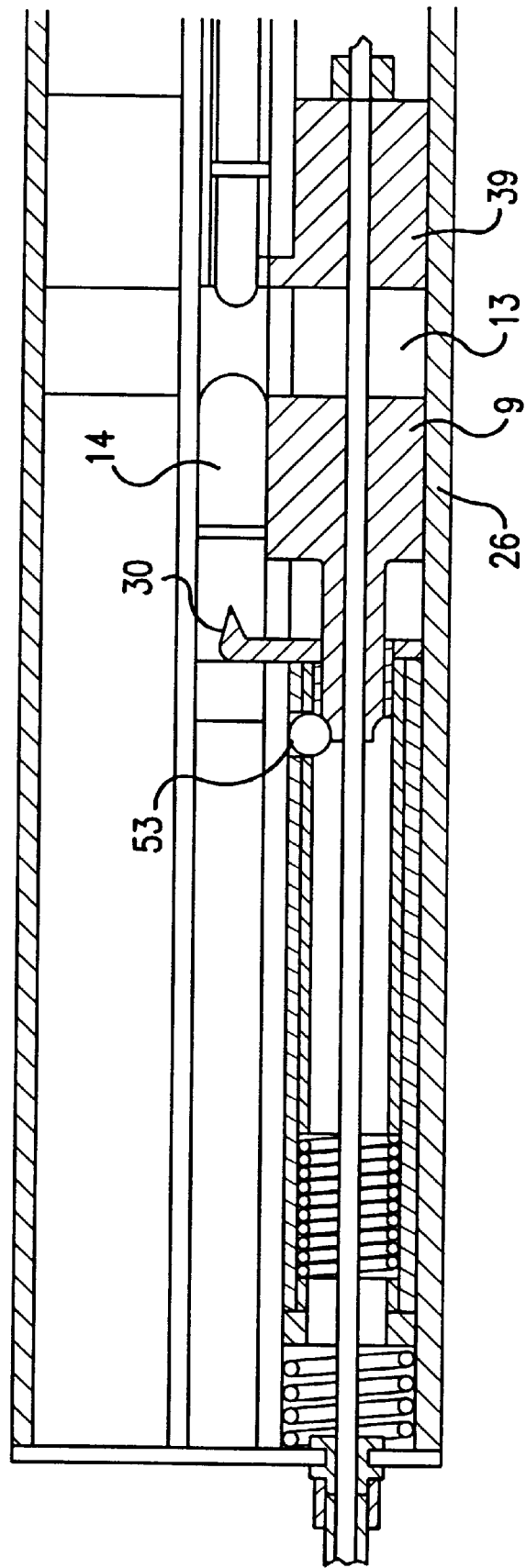
FIG. 10 shows a drive device with an integrated sensor device for triggering a mechanical initial ignition.

In the embodiment shown in FIG. 10, a mechanical igniting device is provided for initial ignition. In the resting state shown, the igniting device is held in its pretensioned position by means of a lock in the form of a ball. When ball 53 is moved out of its locking position by excessive vehicle acceleration (EP 0 560 181), striker point 30 is driven by spring force against the ignition device of cartridge 14. The propellant gas then enters pressure chamber 13 at the backs of the two pistons 9 and 39, which are driven in opposite directions as explained above.

Figure 11:
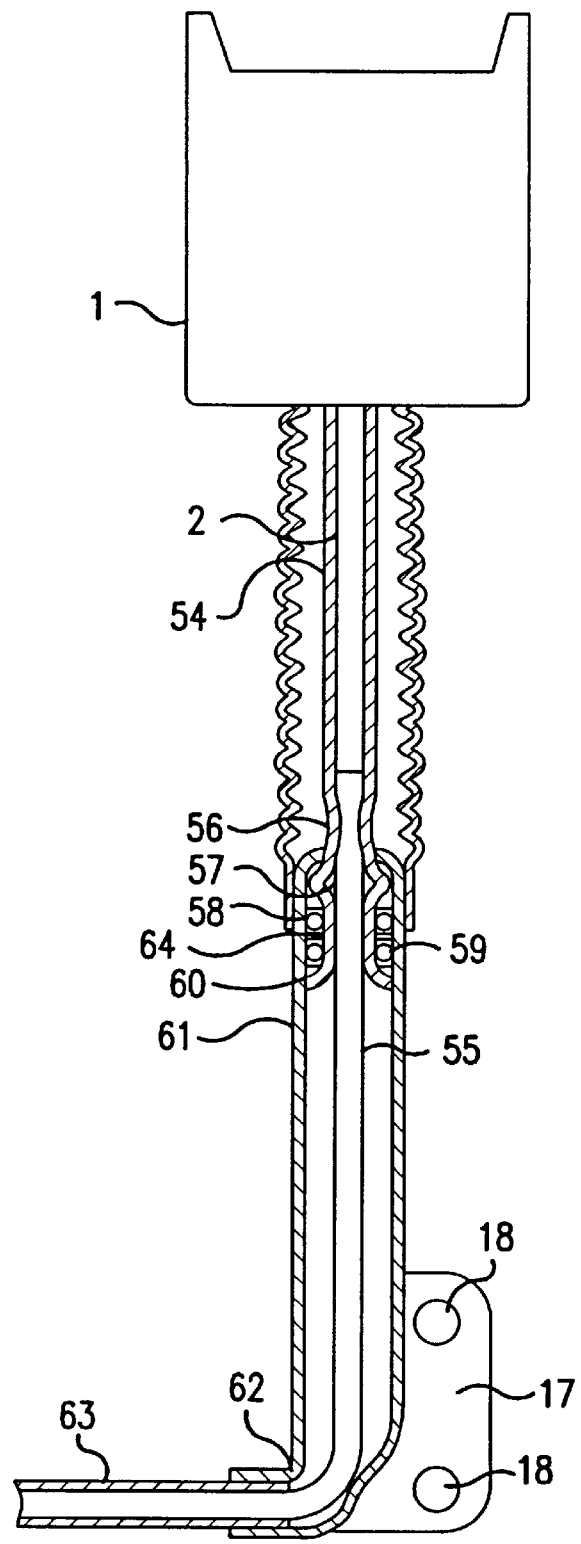
FIG. 11 shows an embodiment of a connection of a piston drive to a component to be moved, in the form of a Bowden cable.

In the embodiment shown in FIG. 11, belt buckle 1 is connected with a tubular retaining device 54. This device is surrounded by bellows 2. Tubular retaining device 54 is connected by a cable compressor 56 with a Bowden cable 55. The lower tubular end of retaining device 54 is located in an external guide tube 61. Guide tube 61 can be fastened by means of fastening part 17 to the vehicle tunnel or vehicle seat.

A return lock is molded on the lower end of retaining device 54 that is inserted into guide tube 61. The return lock has a conical surface 54 formed on the lower tubular section of retaining device 54, with the larger diameter of this surface being located at the bottom. To complete the return lock, two ball rings 58 and 59 are provided as locking bodies between the inside wall of guide device 61 and conical surface 64. To secure ball rings 58 and 59, stops 57 (top stop) and 60 (bottom stop) are shaped on the tubular section of retaining device 54 that is inserted into guide device 61. In this manner, simply by shaping the lower part of tubular retaining device 54, a connection to Bowden cable 55 is provided by cable compressor 56 and by the design and positioning of the return lock as explained in detail.

In the resting state shown in FIG. 11, the return lock is at the upper part of tubular guide device 61. At its lower end is a Bowden cable receptacle 62, to which an outer jacket 63 of the Bowden cable is permanently attached. Possible additional deflecting means, in the form of rollers or a deflecting channel molded in a block, can be provided in the lower part of guide device 61 to guide Bowden cable 55.

When tension cable 55 is driven by one of the piston drives, especially in a central energy device, belt buckle 1 is pulled downward. Ball rings 58 and 59 then move along the area of conical surface 64 with the smaller diameter. To prevent reversal of movement following the tightening process, ball rings 58 and 59 are pushed onto the larger-diameter area of conical surface 64 and jammed between the conical surface and the inside surface of guide device 61. In this case, possibly by material deformation against the wall of guide device 61, for example by the penetration of ball rings made of a harder material, energy can be absorbed in the return lock.

Figure 12:
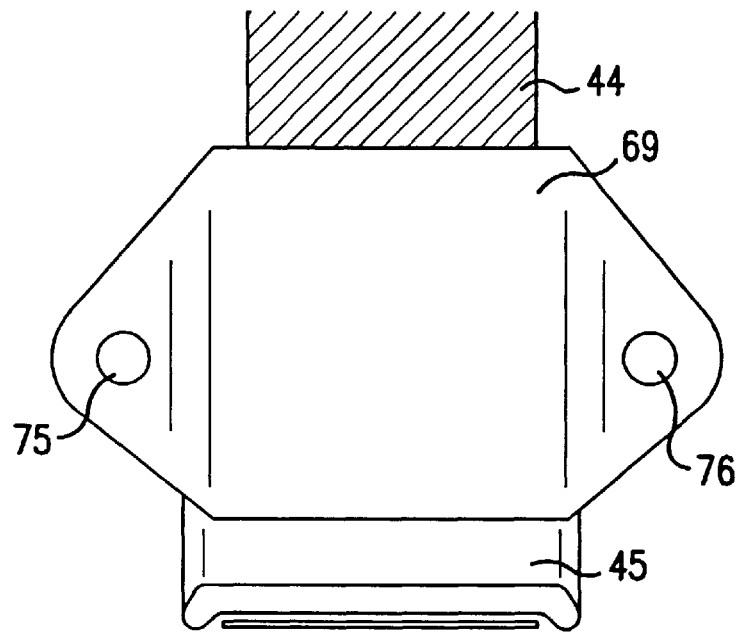
FIG. 12 is a top view of another embodiment of a return lock.
Figure 13:
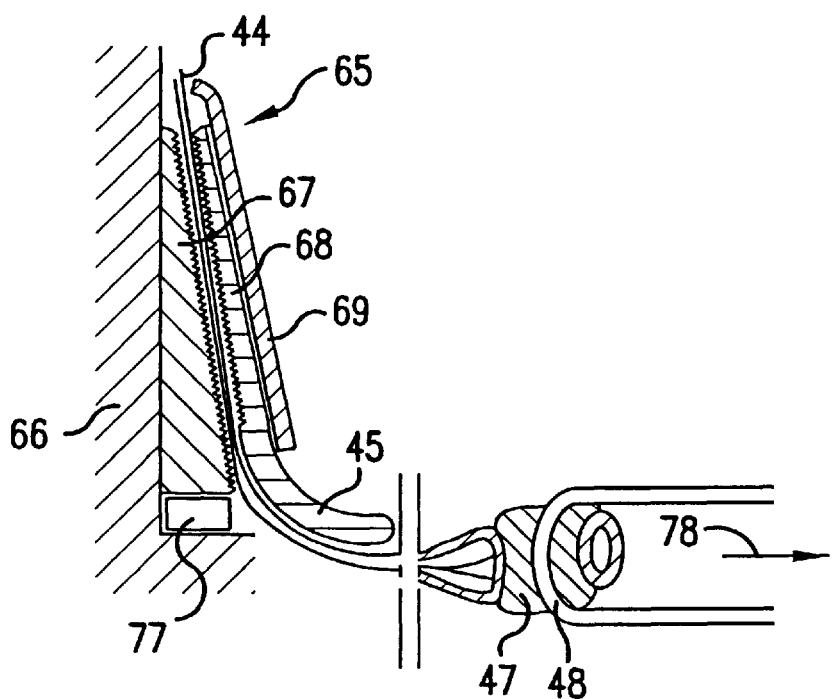
FIG. 13 is a side view of the return lock shown in FIG. 12.

In FIGS. 12 and 13, another embodiment of the connection of the piston drive by means of webbing 44 is shown. Webbing 44 in the embodiment shown is connected with the end of a seat belt. By means of adapter ring 7 and double rod 48, webbing 44 is connected with the piston drive in the same manner as in the embodiment shown in FIG. 6.

In the embodiment shown, a clamping device 65 serves as the return lock. The clamping device has two clamping elements 67 and 68. The clamping device is permanently connected with the aid of a fastening panel 69 at fastening points 75 and 76 with vehicle body 66. Vehicle body 66 can be a vehicle pillar, for example a B pillar. During normal operation, wedge-shaped clamping element 67 is pressed upward by means of a leaf spring 77 that abuts the vehicle body so that there is a frictional connection with webbing 44. The webbing is guided between the two clamping elements 67 and 68. The two clamping elements 67 and 68 possess roughened, especially toothed, surfaces that ensure that the webbing is connected firmly with vehicle body 66 during normal operation. In this manner, clamping device 65 acts as an end stop for the seat belt during normal operation.

When the belt is tightened, double rod 48 is moved by the piston drive in the direction of arrow 78. In this direction of motion, the frictional link between clamping elements 67, 68 and webbing 44 is automatically released against the force of spring 77 so that the component connected with the webbing 44, for example the seat belt, can be tightened without difficulty. After the operation of the tightener is complete, since motion in a direction that automatically releases the frictional connection is no longer present, clamping element 67 is again urged upward by the action of spring 77 so that the frictional connection between clamping elements 67 and 68 and webbing 44 is restored. Clamping device 65 then acts as a return lock.

In the tightener drive, webbing 44 can be guided around guide panel 65 molded on clamping element 68 as in the embodiment in FIG. 6. A seat belt buckle can also be connected with webbing 44.

Figure 14:
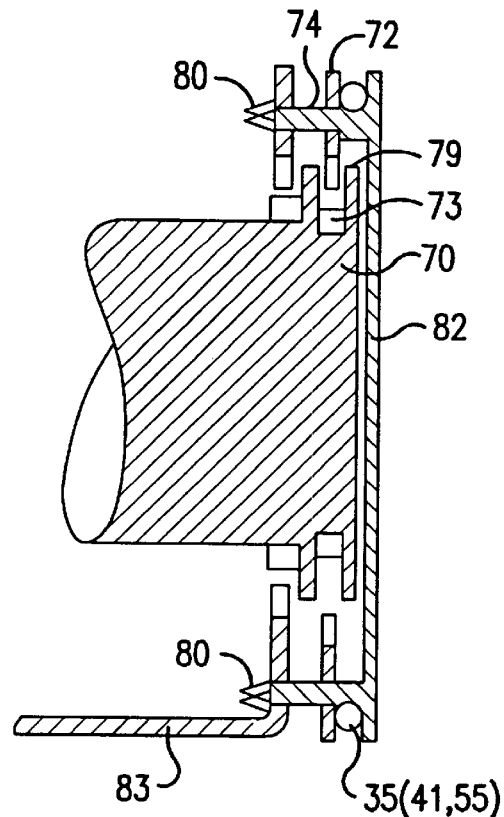
FIG. 14 shows a lengthwise section through a coupling that can connect a winding shaft of a belt retractor with the tensioning cable of the drive device.
Figure 15:
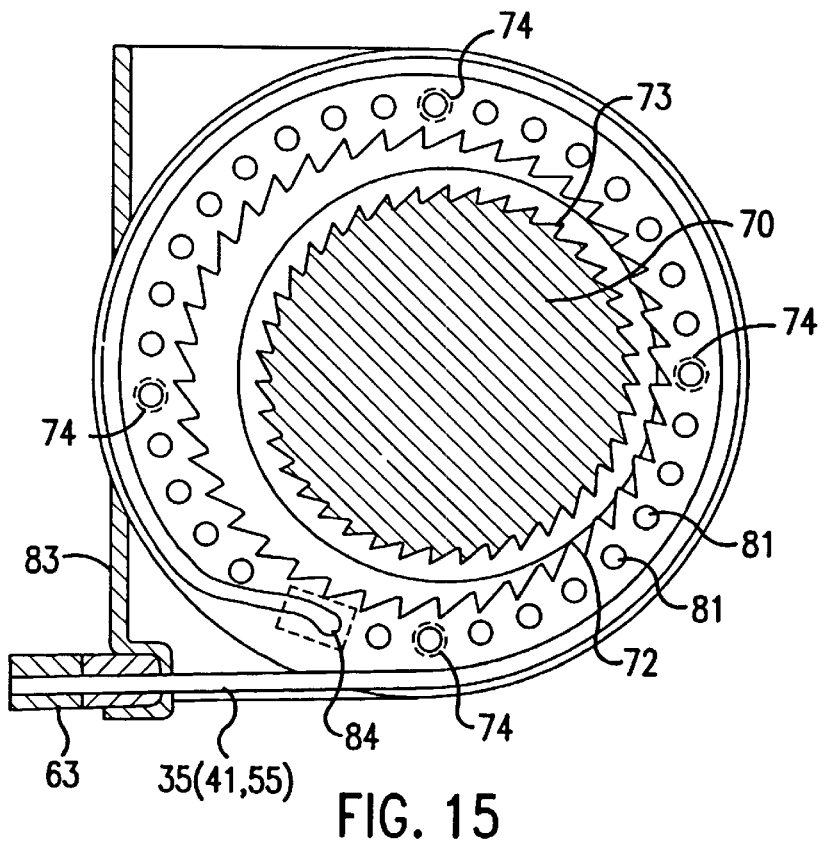
FIG. 15 shows a section made transversely to the winding shaft axis of the coupling device shown in FIG. 14.

The embodiments shown in FIGS. 14 and 15 have a coupling by which the tensioning cable, which can be designed in the manner of tensioning cables 35, 41, and 55 described above, can be brought into a driving connection with a rotatable part during tightening. For this purpose, the coupling has an external coupling element 72 and an internal coupling element 73. Both coupling elements have toothed rings which are disengaged from one another during the normal operation as shown. Internal coupling element 73 is permanently connected with a winding shaft 70 of a belt retractor. It is mounted as a toothed ring on winding shaft 70. On both sides of the toothed ring, stop flanges 79 are molded that extend around the winding shaft.

External coupling element 72 has an inwardly pointing toothed ring that has a larger diameter than the outwardly pointing toothed ring of internal coupling element 73. With the aid of locking means 74, external coupling element 72 is mounted on the housing or frame of the belt retractor. For this purpose, on the forward ends of locking means 74 designed as shear pins, clips 80 are provided. The clips pass through openings in the belt retractor frame or housing. As is particularly clear from FIG. 14, a portion of the tooth crown of outer coupling element 72 projects between stop flanges 79 formed on winding shaft 70 so that when coupling occurs, reliable sideways guidance is guaranteed.

Tensioning cable 35 is wrapped around outer coupling element 72. At a fastening point 81, the end of the tensioning cable is connected with outer coupling element 72, for example by compression. Tensioning cable 35 is guided in a guide groove on coupling element 72. The guide groove can be formed on one side by the toothed ring and on the other side by a guide plate 82 that is inserted into recesses or openings 81 of the toothed ring. The underside of the guide groove can be formed by a ring formed on guide plate 82. The tensioning cable can also be designed as a tensioning cable 55 of a Bowden cable as in the embodiment of FIG. 11, whose Bowden cable jacket 63 is attached at its end to the housing of frame 83 of the belt retractor.

When a pull is exerted by the piston drive on tensioning cable 35, locking means 74 designed as shear pins are released so that outer coupling element 72 can rotate freely. Then an angular range of the inwardly directed toothed ring of coupling element 72 is brought into engagement with the toothed ring of inner coupling element 73 so that the pulling motion of tensioning cable 35 is converted to a rotary movement and transferred to winding shaft 70. The seat belt webbing that is wound on winding shaft 70 is then tightened. As a result of the pull or the force that is exerted between the inner of the gripping teeth during tightening, the toothed rings of the two coupling elements 72 and 73 remain engaged with one another during the tightening process. As soon as the tightening movement stops, outer coupling element 72 becomes loose relative to inner coupling element 73 so that winding shaft 70 can be turned with respect to outer coupling element 72. This rotary movement can take place jerkily as a result of occasional engagement of teeth, or with chattering. In the event of improper triggering of the tightening device, this indicates to the vehicle occupant that the system must be replaced.

The toothed rings of coupling elements 72 and 73 are made of a hard material, steel for example, and guide plate 72 as well as molded locking means 74 can consist of plastic. To connect guide plate 82 with the external toothed ring, the plastic of guide plate 82 can be poured into openings 81 of the toothed ring.

Figure 16:
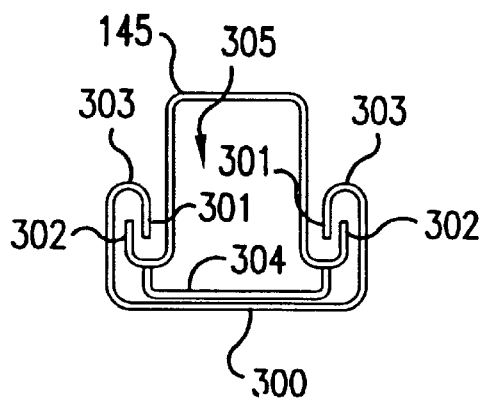
FIG. 16 shows a schematic cross section through a first embodiment of a top rail of a motor vehicle seat and a bottom rail, in a combination in which one is guided in the other.

FIG. 16 shows a schematic cross section through a bottom rail 300 and a top rail 145 received slidably and displaceably therein. In principle, bottom rail 300 has a U shape in cross section that in the embodiment shown has free ends 301 bent inward. In addition, top rail 145 also has a basically U-shaped form as viewed in cross section, but with free ends 302 bent outward. The dimensions of top rail 145 and bottom rail 300 with their free ends bent in the manner described is such that free ends 302 of top rail cross section engage grooves 303 formed by free ends 301 of bottom rail 300 and are guided therein.

The U-shape of top rail 145 is closed off by a rib 304, namely over its lengthwise extent, at least over an area that is sufficient to receive at least one power-storing device and/or at least one drive device, such as a pyrotechnic power-storing device 174 and/or a central drive device 103 or 153 (see also DE 197 07 998.9). A power-storing device and/or a drive device of this kind can be used to perform various functions, including stabilization, especially locking, of the heightwise and/or the tilt adjustment device for the seat part, raising the front edge of the seat part for adjusting its tilt, additional support of the seat part at the top rail, actuating a cushion support in the vicinity of the forward half of the seat part, tightening a seat belt, supporting the seat back on a seat frame or a seat bottom structure of the seat part and/or at the top rail, moving the headrest into a protective or safety position, and triggering and inflating airbag devices that are integrated particularly into the vehicle seat, such as side airbag devices for the thorax and/or head. These functions may be performed, for example, in the device shown in FIG. 16A, which is a drive device on a seat rail.

In the examples described below, it is assumed, merely as an example and not in a limiting fashion, that a belt tightener is to be actuated. Thus top rail 145 in FIG. 16 is an angular seat rail into which a belt tightener, or more precisely, its components, can be integrated.

In the design shown in FIG. 16, rib 304 likewise has a U-shaped cross section which is open toward the open side of the U-shape of top rail 145, and rests in the manner of a lid over the open side of the U-shape of top rail 145, which can also be referred to as a rail. Rib 304 is welded permanently In this position for example so that an interior space 305 is formed with a roughly rectangular cross section. The interior chamber 305 thus enclosed in top rail 145 serves to accept the at least one power-storing device and/or the at least one drive device, so that no special housing is necessary therefor, for example the hollow cylindrical rotating parts 169, 170, and 171 according to DE 197 07 998.9. As a result, not only weight and expense but space as well are saved.

Figure 17A:
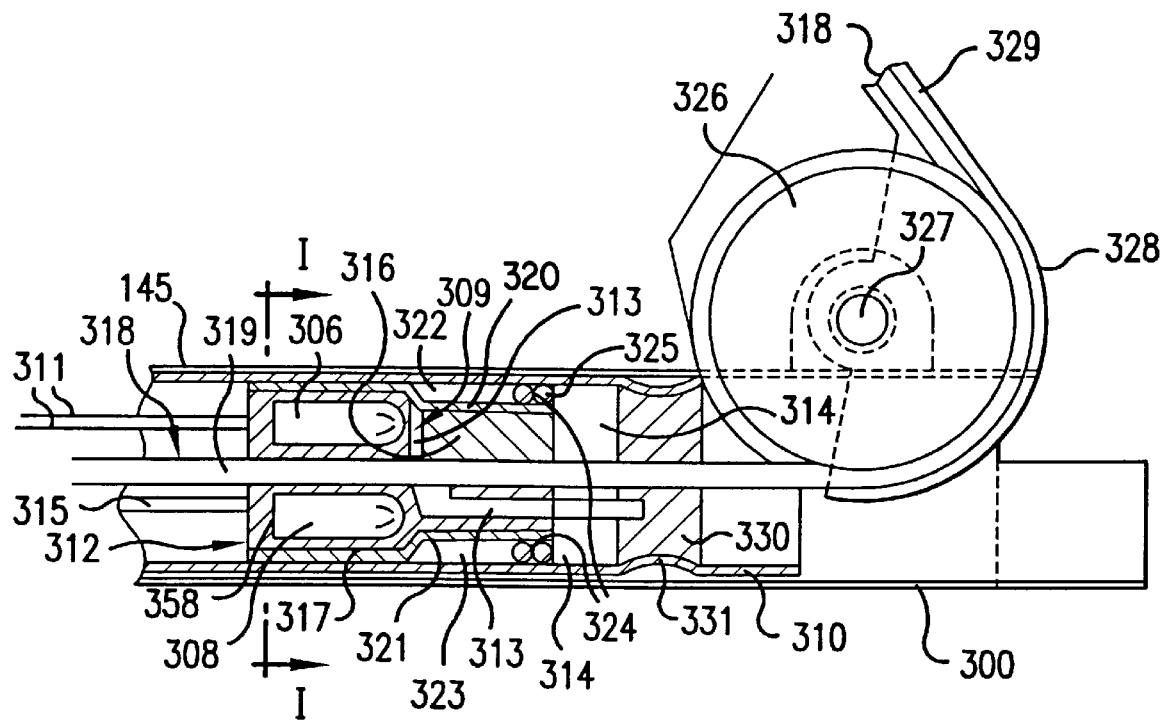
FIGS. 17A and 17B show a lengthwise and a transverse section, respectively, through a second embodiment of a top rail of a motor vehicle seat and a bottom rail, in a combination in which one is guided in the other, with the cross section in FIG. 17B being made along line I—I in FIG. 17A.
Figure 17B:
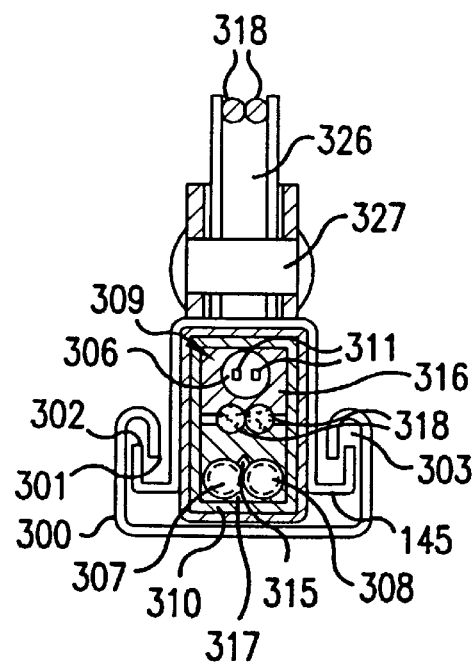

In FIGS. 17A and 17B, in the lengthwise and cross sections along line I—I in FIG. 17A, another embodiment of top rail 145 is shown that is a rectangular seat rail with an integrated belt tightener. In the lengthwise section in FIG. 17A, at least one power-storing device 306, 307, and 308 (see also FIG. 17B) of an area of this rectangular seat rail 145 that receives drive device 309 is shown. Drive device 309 with power-storing devices 306, 307, and 308 (see also FIG. 17B) is then located in an insert 310, an aluminum insert for example, mounted permanently in top rail 145. The insert is insertable as a module into top rail 145. In other words, the rib 304 according to the embodiment in FIG. 1 is formed by one side of insert 310.

This modular design permits efficient prefabrication of the drive device and power-storing device components which as a result can be easily inserted into top rail 145 and if necessary can also be replaced without top rail 145 itself being affected. Such a module can be replaced after an accident, for example. Insert 310 can also be made less stable than if it were to serve alone as the housing of the drive device and power storing device components, with the latter therefore being mounted outside top rail 145, since top rail 145, because of its intrinsic stability, ensures the function of the drive device and power-storing device components.

Power-storing device 306 is ignited first, electrically by leads 311. As a result, a piston 312 is urged to move leftward inside the insert in FIG. 17A, with the explosion gases from a cartridge forming power-storing device 306 being conducted through a pressure channel 305 into a receiving chamber 314 (to the right of piston 312 in FIG. 17A). Piston 312 moves inside insert 310 and along rim fire igniter rod 315 that extends in a fixed position in the lengthwise direction. By a suitable design of rim fire ignition rod 315, which can also be referred to as an ignition strip, the other power storing devices 307 and 308, i.e. corresponding cartridges, are ignited mechanically when they, together with piston 312, are traversed for example by an ignition nose (not shown) of rim fire ignition rod 315. Corresponding ignition noses (not shown) can be provided at various locations along the path of movement of piston 312 on rim fire ignition rod 315 so that power-storing devices 307 and 308 are ignited mechanically in succession at specified time intervals.

The vehicle seat (not shown) on which the belt buckle (not shown) is mounted at least essentially in a permanent position is height-adjustable with respect to top rail 145 so that the distance of the belt buckle (not shown) from drive device 309 during height adjustment of the vehicle seat (not shown) changes. Piston 312 therefore contains two piston parts 316 and 317 between which one or more tensioning cables run. In the present embodiment shown in FIGS. 17A and 17B, a tensioning cable 318 with its two free ends 319 (at the left in FIG. 17A) is guided between piston parts 316 and 317 so that a loop (not shown) is formed (at the upper right in FIG. 17A). The loop is connected in a secure and permanent fashion with a belt buckle (not shown) for example. Tensioning cable 318 constitutes force and/or motion transmission devices for transmitting forces and movements from the drive devices in the present embodiment to a belt buckle (not shown) and/or to parts of other safety devices. When piston 312 is urged by power-storing devices 306, 307, and 308 and therefore moves to the left in FIG. 17A, the two piston parts 316 and 317 are pressed against one another in such fashion that tensioning cable 318 is clamped therebetween and as a result is moved along with piston 312. In other words, the first electrically ignited cartridge 306 generates a pressure that displaces the first wedge-shaped piston part 316 opposite to the later direction of movement of piston 312, and together with tensioning cable 318 jams piston part 317. This is shown more clearly in FIGS. 31A to E which will be described in greater detail below.

Piston 312 therefore can be referred to as a cable-clamping piston and constitutes an entraining device for tensioning cable 318. Such an entraining function is necessary, since tensioning cable 318, when drive device 309 has not been triggered because of the heightwise adjustability of the vehicle seat thus equipped, must be able to slide freely through piston 312. The ends 319 of tensioning cable 318 are attached for example to insert 310, mounted on top rail 145, in such fashion that tensioning cable 318 can shift relative to insert 310 between two positions, especially continuously. The positions correspond to the highest and lowest vehicle seat positions. As a result, tensioning cable 318 adjusts the position of insert 310 and hence of drive device 309 on the one hand and the rest of the vehicle seat (not shown) on the other hand, in various vehicle seat height positions, with an essentially constant position of the belt buckle relative to the vehicle seat. In the event of tensile stress, such as in a collision, tensioning cable 318 is secured at a stop (not shown) in a position in which it is pulled out to the furthest extent from insert 310 (toward the right in FIG. 17A). This position preferably corresponds, at least for the most part, to the position of tensioning cable 318 when the highest vehicle seat position has been set.

In addition, each of piston parts 316 and 317 has wedge-shaped surfaces 320 and 321, each of which forms, with the inside wall of insert 310, an interior chamber 322 or 323 that tapers in the direction of movement of piston 312 when it is urged by power-storing devices 306, 307, and 308. In the vicinity of the wide ends of these interior chambers 322 and 323, clamping balls 324 are provided that are entrained by a flange 325 of piston 312 as it moves when piston 312 is urged by power-storing devices 306, 307, and 308. However, if a backward movement of piston 312 occurs that opposes the movement described above, with a pull being imposed on the corresponding belt buckle (not shown) for example, then piston 312 moves in such fashion that the clamping balls enter the area of the narrow ends of interior chambers 322 and 323 and cause piston 312 to jam in insert 310, so that piston 312 is locked into inset 310 and its further backward movement is reliably suppressed. Wedge-shaped surfaces 320 and 321, together with the corresponding inside wall of insert 310 and clamping balls 324, thus constitute a return lock for piston 312.

The entrainment function on the one hand and the return locking function on the other of piston 312 are also individually of independent inventive significance for height-adjustable motor vehicle seats, especially when combined. This independent inventive significance also applies to the combination of the entrainment function and the return locking function with the designs and features disclosed in DE 197 07 998.9 and DE 196 41 224.2.

Since top rail 145 with its inserts, for example insert 310, drive device 309 and power-storing devices 306, 307, and 308, piston 312, etc. runs at least essentially parallel to the seat surface (not shown), while the belt buckle (not shown), projects at an angle thereto, for example at least approximately or nearly perpendicularly, tensioning cable 318 must be deflected. A roller 326 is provided for this purpose. This roller is rotatable around an axis 327 over which tensioning cable 318 is guided. The cable 318 is provided because of the heightwise adjustability of the vehicle seat (not shown) and hence of the belt buckle (not shown). In order for tensioning cable 318 to be secured reliably in the guide of roller 326, at least the part of roller 326 in which tensioning cable 318 abuts the latter is surrounded by a cover or sliding panel 328. Sliding panel 328 makes a transition to the belt buckle (not shown) in a guide 329. FIG. 17A shows one possible angle between guide 329 and top rail 145 which is intended only as an example.

The pressure chamber 314, on its side facing away from piston 312, is sealed by an end piece 330 that is secured for example by clinching 331, in other words by pressing the insert against the correct point, so that pressure chamber 314 is tightly sealed on the one hand by piston 312 and on the other hand by end piece 330.

Figure 18A:
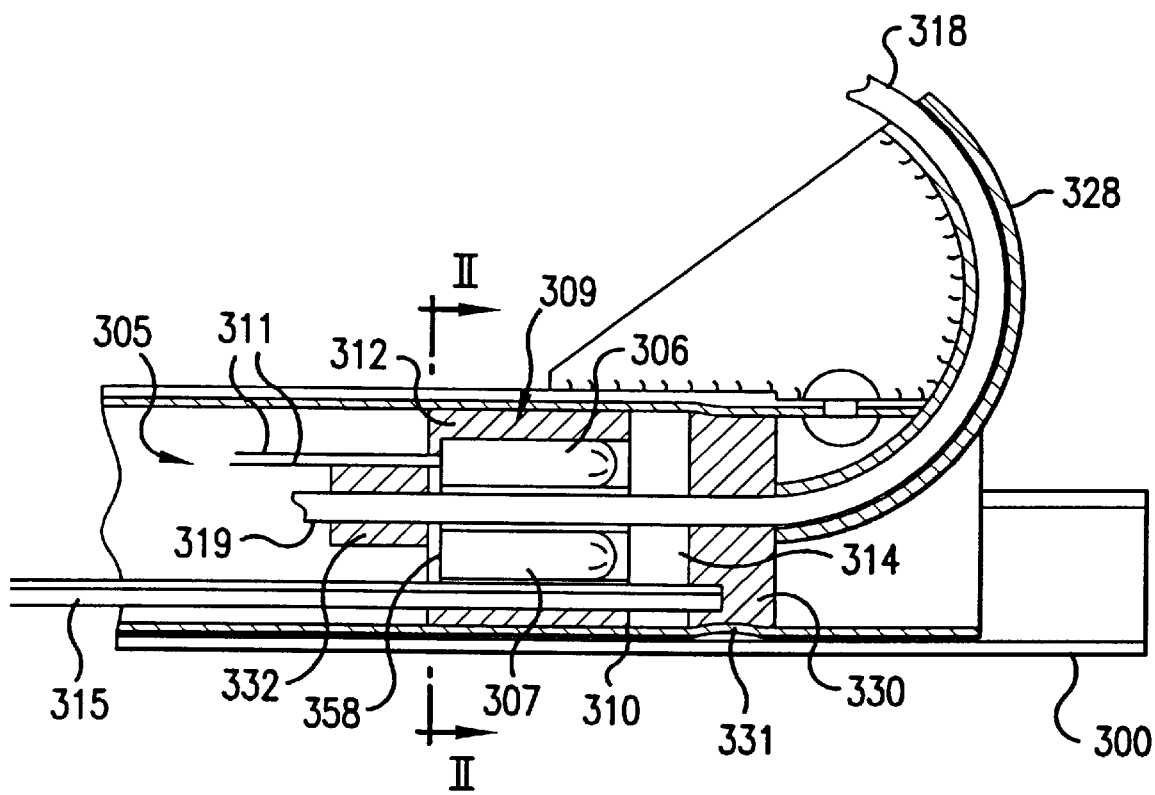
FIGS. 18A and 18B are lengthwise and transverse sections, respectively, through a third embodiment of a top rail of a motor vehicle seat and a bottom rail, in a combination in which one is guided in the other, with the cross section in FIG. 18B being made along line II—II in FIG. 18A.
Figure 18B:
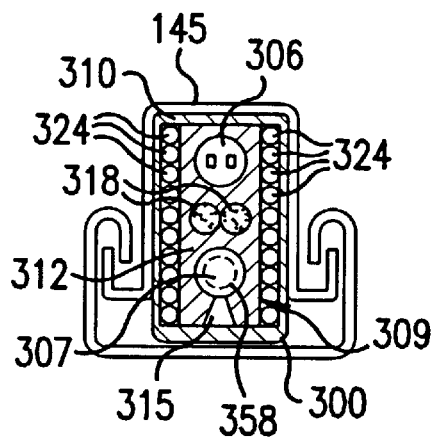

FIGS. 18A and 18B, like FIGS. 17A and 17B, show another embodiment of the invention with a largely identical design. To the extent that the design shown in FIGS. 18A and 18B correspond to that described in FIGS. 17A and 17B, as is indicated in particular by identical reference numbers as well as an identical or similar representation in the individual figures, the corresponding features in FIGS. 18A and 18B will not be described. In FIGS. 18A and 18B, some reference numbers have also been omitted for the sake of clarity, but as a result of a comparative examination, especially of FIGS. 17A and 17B but also of FIG. 16, the corresponding features and parts would be readily apparent to an individual skilled in the art. On the other hand, the reference numbers in FIGS. 18A and 18B also help to identify features and parts in FIGS. 17A and 17B.

The important difference between the design shown in FIGS. 18A and 18B and that shown in FIG. 17A and 17B is that the design according to FIGS. 18A and 18B is for a seat without provision for height adjustment. For this purpose, it is sufficient for piston 312 to be in one piece and for tensioning cable 318 to be fastened to it by its two free ends 319 to withstand tension, so that a loop (not shown) is formed that is connected securely and permanently with a belt buckle for example(not shown). Tensioning cable 318 is consequently moved along with piston 312 when the latter is urged by power storing devices 306, 307, and 308. Tensioning cable 318 is locked to piston 312 by a fastening part 332. Piston 312 therefore does not have to be designed as a cable clamping piston, as in the previous embodiment shown in FIGS. 17A and 17B, but is a simple piston.

Because of the lack of heightwise adjustability of the vehicle seat, in the present embodiment according to FIGS. 18A and 18B, no roller is required to deflect the tensioning cable from the plane of top rail 145 in the direction of the belt buckle (not shown) and the belt lockable therein. Guide 329 therefore connects directly to end piece 330 and guides tensioning cable 318 in the desired direction.

Another difference between the design of the embodiment shown in FIG. 18A and 18B and the version according to FIGS. 17A and 17B consists in the fact that only two stages, in other words only two power-storing devices 306 and 307, are provided, while the version shown in FIGS. 17A and 17B has three stages. The power-storing devices 306, 307 in FIGS. 18A and 18B are an electrically ignited and a mechanically ignited cartridge, respectively, with the latter being ignited by ignition strip 315 as a result of the movement of piston 312 that results from the ignition of first power-storing device 306.

In the embodiment according to FIGS. 17A and 17B, clamping balls 324, in the position shown, are distributed around piston 312, while clamping balls 324 in the version shown in FIGS. 18A and 18B are located only laterally.

Figure 19B:
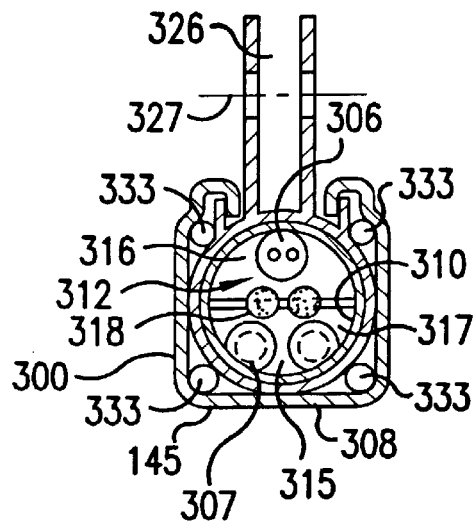
FIGS. 19A and 19B are lengthwise and transverse sections, respectively, through a fourth embodiment of a top rail of a motor vehicle seat and a bottom rail, in a combination in which one is guided in the other, with the cross section in FIG. 19B being made along line III—III in FIG. 19A.
Figure 19A:
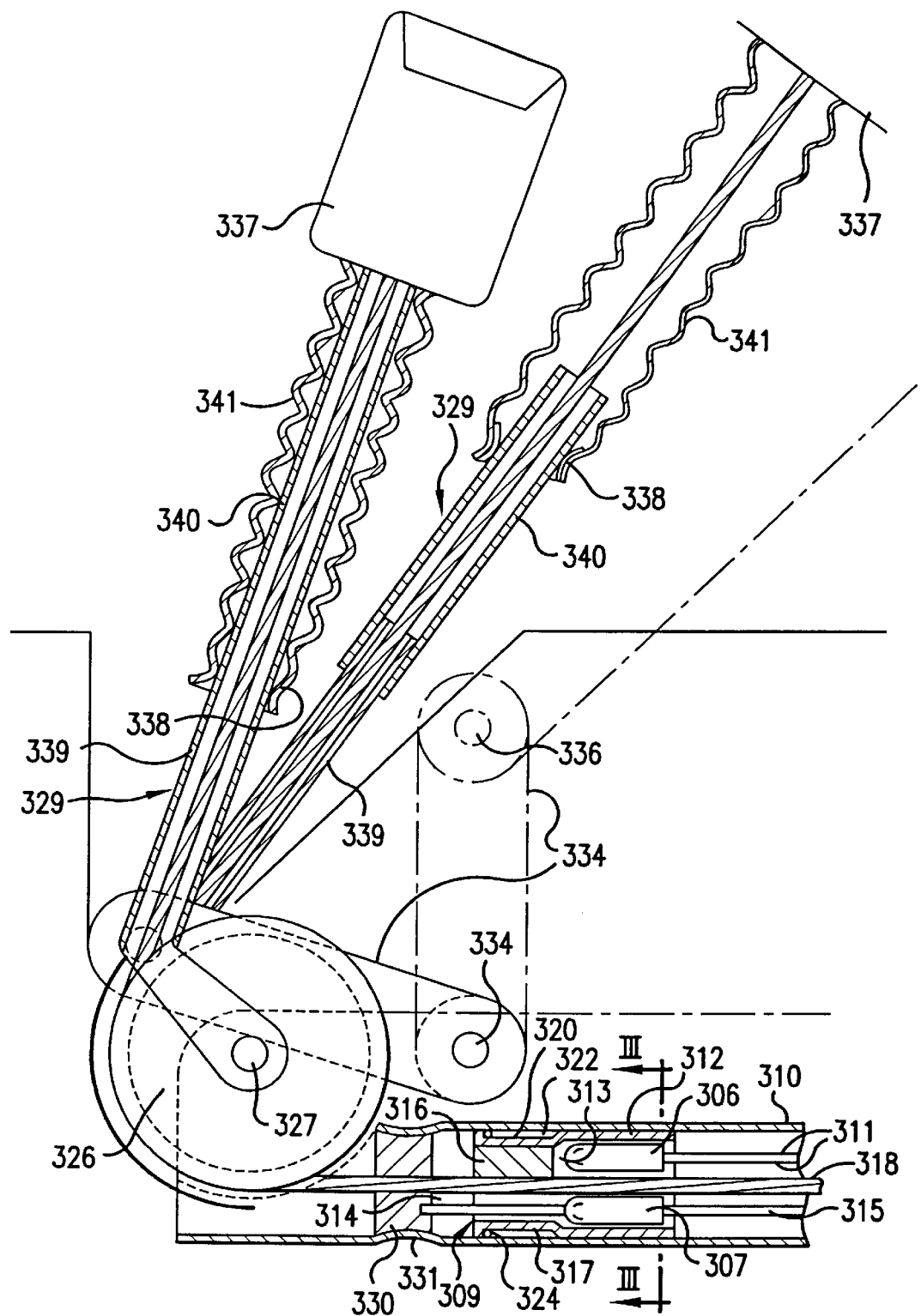

In addition, the design according to FIGS. 19A and 19B has numerous analogies and points of correspondence with the version shown in FIGS. 17A and 17B, so that here again repetition has been avoided provided that the same or similar features or parts are involved. For the individual skilled in the art, the corresponding as well as additional information is obtained from a comparison of the versions in FIGS. 17A and 17B, 18A and 18B, and 19A and 19B on the basis of both the reference numbers and the parts and their representations, possibly alone, when reference numbers have been partially omitted from the figures for the sake of clarity.

As the view in FIG. 19B shows, this design is a three-stage version with three power-storing devices 306, 307, 308. The corresponding cartridges in the case of power-storing device 306 are ignited electrically through leads 311 and mechanically in the case of power-storing devices 307 and 308, in each case through ignition strip 315, as already described in conjunction with FIGS. 17A and 17B.

Since the version shown in FIGS. 19A and 19B is also a design for a height-adjustable vehicle seat, as is the case in FIGS. 17A and 17B, piston 312 is once again made in two parts, similarly to the design in FIGS. 17A and 17B, a fact which, together with the purpose that lies behind it and the effects that are achieved with it, has already been set forth in detail above, so that the corresponding parts, features, and functions will not be discussed in any further detail here.

As can clearly be seen from FIG. 19B, in contrast to the previously discussed embodiments, in the present case a cylindrical top rail 145 is used that accordingly contains a suitable cylindrical insert 310, which for example once again is an aluminum insert. What is more, cylindrical top rail 145 does not simply slide but is mounted so as to be displaceable by balls 333 in bottom rail 300. The connection to the seat (not shown) is made by pivotable supports 334, one of which is visible in FIG. 19A and is shown by solid lines in its lower position and by dot-dashed lines in its upper position. Supports 334 are pivotable around respective axes 335 between the lower and upper positions. At the end opposite shaft 335, each support 334 is articulated by a shaft 336 on the corresponding seat (not shown).

As already explained in conjunction with FIGS. 17A and 17B, in the version according to FIGS. 19A and 19B, tensioning cable 318 is also displaceable with respect to two-piece piston 312 together with the entrainment function and return locking function, provided the piston is not being or has not been urged, since the vehicle seat (not shown) is height-adjustable. During the height adjustment of the vehicle seat (not shown) belt buckle 337 remains fixed relative to the vehicle seat (not shown) so that slight displacements can occur and are harmless to the function.

Belt buckle 337 is connected by guide 329 with top rail 145 or roller 326 associated therewith. In FIG. 19A, in accordance with the lower and upper positions of supports 334 as explained above and hence of the seat (not shown), belt buckle 337 together with guide 329 is shown in these two positions, with the view on the left in FIG. 19A showing the lower positions and the right hand drawing showing the upper positions of supports 334 and hence of the seat (not shown). With regard to the seat (not shown), belt buckle 337 and guide 329 have a locking point 338 at which a permanent connection to the vehicle seat (not shown) can be made. Locking point 338 therefore constitutes a fixed point relative to the vehicle seat (not shown) on the one hand and belt buckle 337 on the other. Since the motor vehicle seat (not shown), during its height adjustment, because of the pivoting of supports 334 is adjusted not only in the vertical direction but also in the lengthwise direction (of the vehicle), a certain pivoting of guide 329 takes place during adjustment, as indicated by the drawings in FIG. 19A.

In order to be able to compensate for the difference in length of tension cable 318 when belt buckle 327 is in the upper and lower positions, guide 329 is made in the form of a telescoping tube with a lower inner tube 339 and an upper outer tube 340, with this arrangement being provided only as an example. Inner tube 339, during a height adjustment of the seat (not shown) can slide into or out of outer tube 340 to ensure reliable guidance of tensioning cable 318 in every seat position (not shown). In the design under discussion here, furthermore, a cuff 341 is provided in which outer tube 340 is also displaceable and which itself can be stretched in the lengthwise direction, in other words parallel to tensioning cable 318, and can be pulled apart. Flexible cuff 341 provides a tight connection between guide 329 and belt buckle 337 so that neither the seat adjustment nor the belt-tightening function can be adversely affected by jamming caused by contamination inside guide 329. In addition, flexible cuff 341 allows adaptation of the belt buckle position within certain limits to an appropriately seated occupant, so that a seat belt that is being worn (not shown) fits comfortably.

Figure 20:
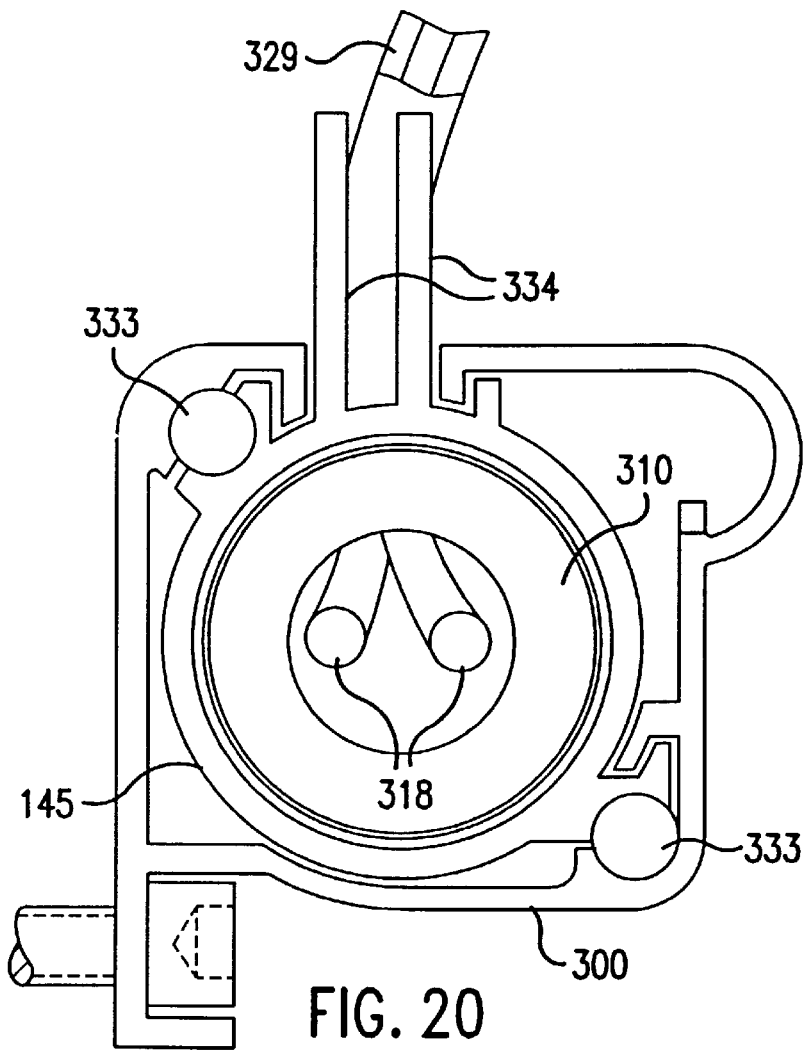
FIG. 20 shows a cross section through a fifth embodiment of a top rail of a motor vehicle seat and a bottom rail, in a combination in which one is guided in the other.

In the embodiment according to FIG. 20, a version similar to that shown in FIGS. 19A and 19B is shown, to the extent that here again a cylindrical top rail 145 and its ball bearing is accommodated by balls 333 in bottom rail 300. However, in the embodiment shown in FIG. 20, no height-adjustable seat (not shown) is used. Consequently, the connection to the seat (not shown) is provided by fixed supports 334, one of which is visible in FIG. 20. In addition, balls 333 are provided in only two rows to guide top rail 145 in bottom rail 300, while on the other hand, in the version according to FIGS. 19A and 19B, four rows of balls 333 are disposed to provide support in the displacement direction and to allow top rail 145 to move. Further embodiments of the design according to FIG. 20 follow from a comparative consideration of the previous figures.

FIGS. 21A–C, 22A–C, 23A, 23B, and 24A, 24B show additional variations for the top rail design in a motor vehicle seat, with seat rail latching being provided between top rail 145 and bottom rail 300. As far as these embodiments are concerned, essentially only those features will be discussed which were not explained previously. Without limitations however, apart from the additional features described, there are six to nine features in the embodiment that are obtained either directly, or by a comparative consideration of previously treated figures, from the corresponding views in the drawings. It is not important whether the features have reference numbers or not, or are simply identifiable as necessary or as alternatives by the individual skilled in the art on the basis of his specialized knowledge and in the light of the previous disclosure.

Figure 21A:
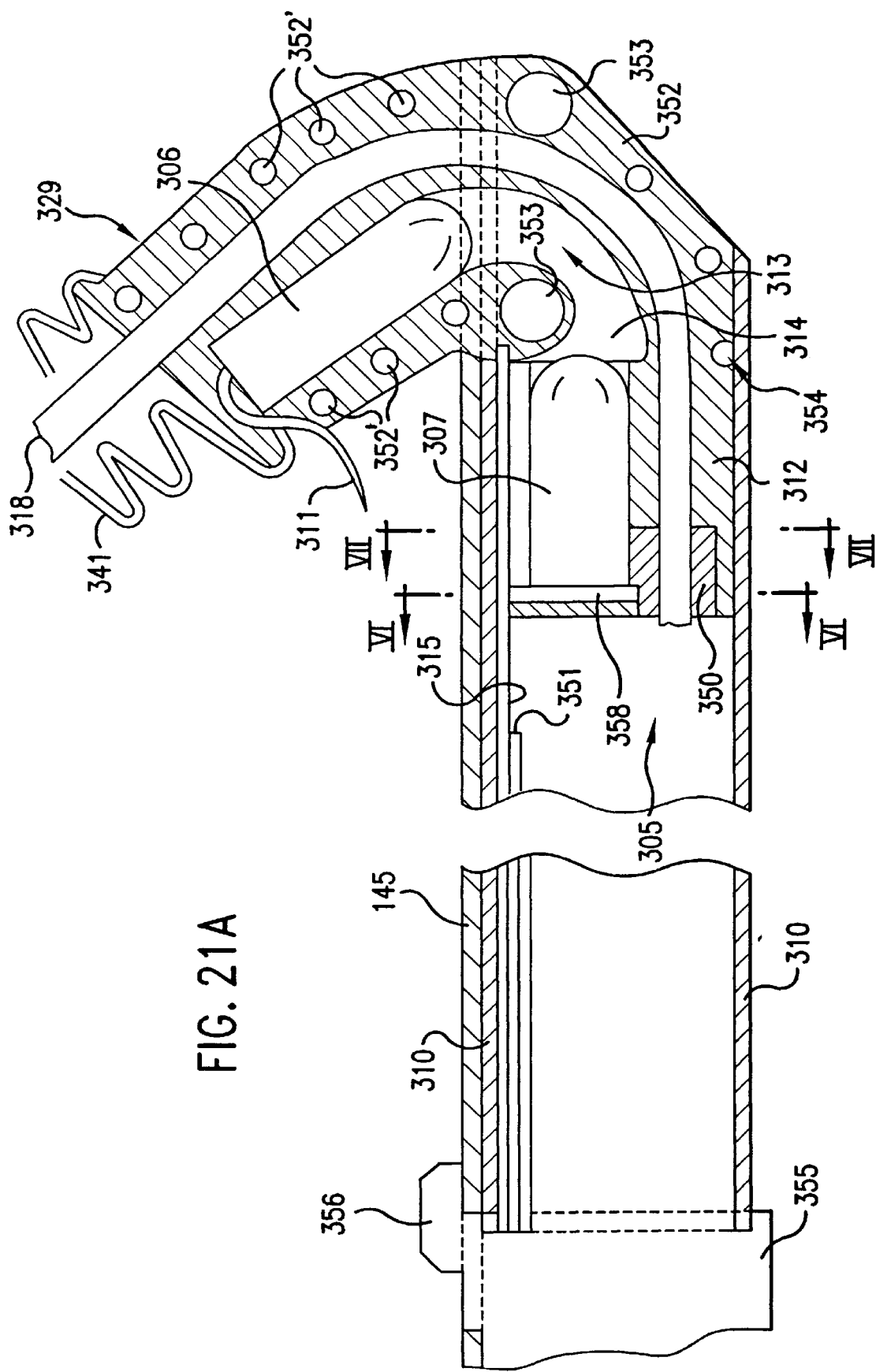
FIGS. 21A, 21B, and 21C show one lengthwise and two cross sections through a sixth embodiment of a top rail of a motor vehicle seat, with the cross sections in FIGS. 21B and 21C being made along lines VI—VI and VII—VII respectively in FIG. 21A.
Figure 21B:
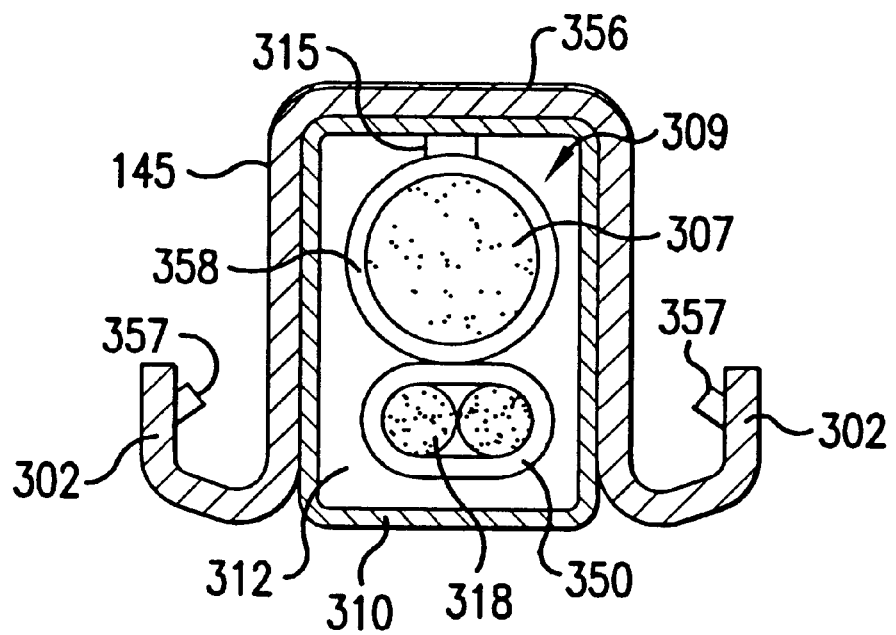
Figure 21C:
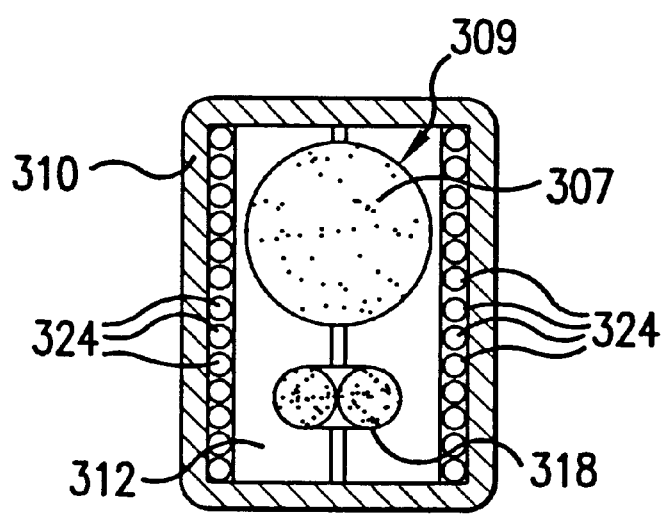

In the embodiments shown in FIGS. 21A, 21B, and 21C, an electrically ignited cartridge of power-storing device 306 is accommodated in guide 329 at the end of a pressure channel 313 that terminates in pressure-receiving chamber 314 which in turn is sealed by piston 312. Guide 329, that deflects tensioning cable 318 from its vertical path within top rail 145 into a path that is at an angle to the belt buckle (not shown), has a two-piece housing of which one half is visible in the section shown. The two housing halves (housing half 352 is visible) are connected by latching pins 352' to one housing half 352 and corresponding latching holes in the other hosing half. In addition, guide 329 is fastened to top rail 145 by rivets 353.

Piston 312 is made in one piece with guide 329 and contains an additional power-storing device 307 for a second stage with mechanical ignition by means of an rim fire ignition rod or ignition strip 315 which has an ignition nose 351 for this purpose. The nose strikes cartridge edge 358 of power-storing device 307 as piston 312 moves under the influence of power-storing device 306. As it moves, piston 312 takes tensioning cable 318 with it, the thimble 350 of the cable being anchored in piston 312 at least against the pulling direction. In order for piston 312, which is made integral with guide 329, to be set in motion when power-storing device 306 is triggered, it must separate from guide 329. For this purpose, a tearing point 354 is provided where guide 329 makes a transition to piston 312. This tearing point 354 is made so thin that the force released by power-storing device 306 following its ignition generates a pressure through pressure channel 313 in pressure-receiving chamber 314 such that piston 312 tears free of guide 329 and moves away from the guide through interior chamber 305 of insert 310. In the course of this movement, cartridge edge 358 of second power-storage device 307 anchored in piston 312 strikes ignition nose 351 of ignition strip 315, resulting in mechanical ignition of the cartridges of power-storing device 307 and also acting on and accelerating piston 312 as a second stage.

Top rail 145 is made in several parts in the present embodiment and consists of the part that receives insert 310 and, adjacent thereto in the lengthwise direction, a latching block 355 for latching top rail 145 to the bottom rail (not shown). The top rail part with insert 310 is coupled to latching block 355 by a suspension 356. To secure it in position, insert 310 projects in the direction of latching block 355 and slightly into the latter, in other words, it projects slightly from its top rail part.

Latching block 355 has latching teeth 357 that can be seen in the cross sectional view in FIG. 21B. Between every two latching teeth 357 on one side of top rail 145 for example, a latching cam (not shown) associated with the bottom rail (not shown) can be engaged in order to secure an adjustment position of top rail 145 relative to the bottom rail, thus allowing seat adjustability in the lengthwise direction.

As can also be seen in the cross sectional view in FIG. 21B, top rail 145 itself is composed of a U-shaped section in which insert 310, which in the present case can also be referred to as the tightening tube, is received. Top rail 145 itself then does not provide a sealed inner chamber to receive insert 310. As shown in FIG. 21C that shows insert 310 in cross section, clamping balls 324 are used correspondingly in this embodiment as well (see FIG. 18B), acting as return locks for piston 312 when the influence exerted on piston 312 by the two power-storing devices 306 and 307 is eliminated, as already described above.

In the present embodiment, latching block 355 is shortened by a certain amount with respect to the vehicle seat top rails without drive devices 309 for safety components, the part being used for drive devices 309 received in another top rail part that is connected with the latching block by suspension 356 that can be screwed in place. For example, this produces a length of 150 mm for insert 310 that contains drive devices 309 and 100 mm travel of the piston 312, 25 mm for the length of the piston and 25 mm for guide 329 with the cable deflector, all measured in the direction of movement of piston 312.

Figure 22B:
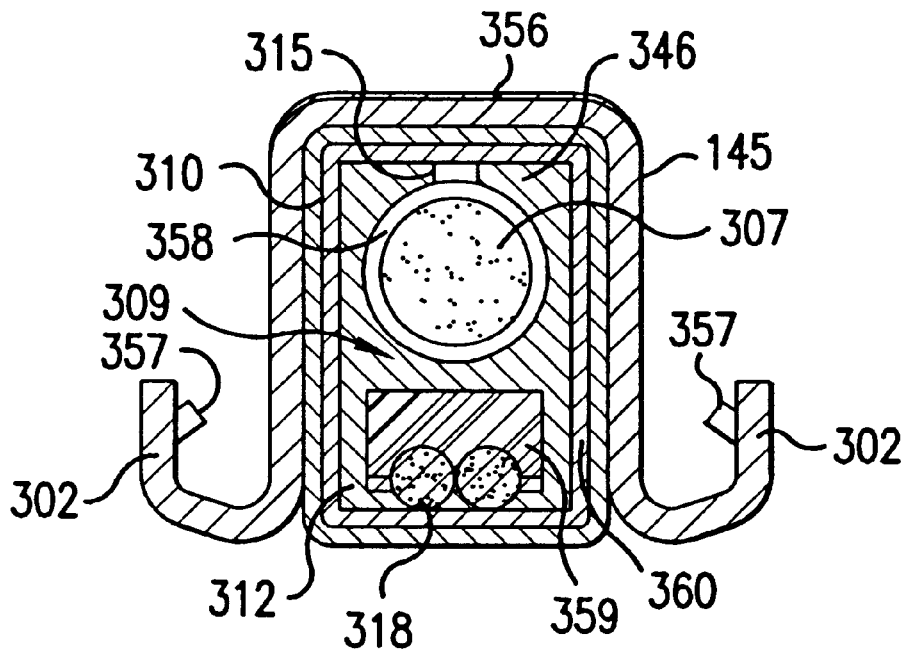
Figure 22C:
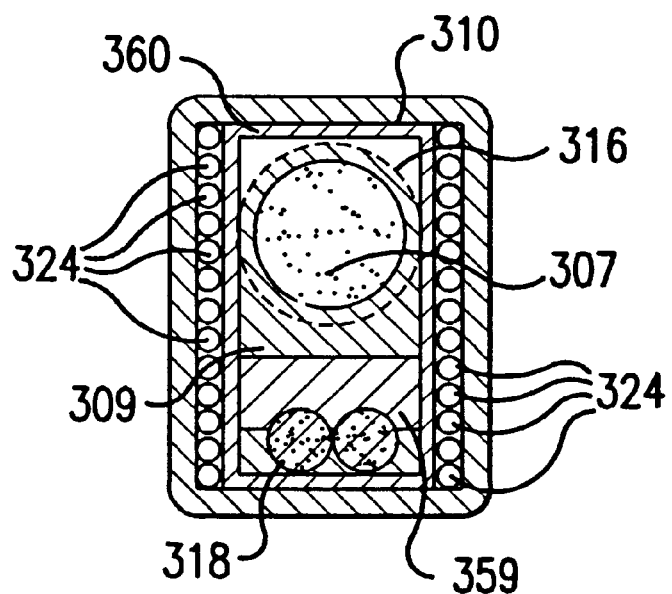

The version in 22A–C relates to a motor vehicle seat with height adjustability, which is not provided in the design shown in FIGS. 21A–C. Therefore piston 312, as can be seen in FIGS. 22A, 22B, and 22C, has a clamping wedge 359 that is initially urged and displaced by the ignition of power-storing device 306, causing a jamming of tension cable 318 against piston 312 before piston 312 itself begins to move and then reliably entrains tensioning cable 318. Although in FIG. 22A, in contrast to FIG. 21A, no tear-off point 354 is shown, since in the present case piston 312 and guide 329 are not made in one piece, such a one-piece design can be used without any limitations. Piston 312 in the tenth design however includes a piston cage 360 that encloses piston part 316 and clamping wedge 359. The return lock with clamping balls 324 is located outside piston cage 360.

In addition, the design in FIGS. 22A–C corresponds to that shown in FIGS. 21A–C.

FIGS. 23A and 23B are a bottom view and a cross-sectional view of a system diagram for a seat with height adjustment and constant belt buckle position.

In the view in FIG. 23A of top rail 145 from below, latching block 355 can be seen, which serves to secure top rail 145 in position relative to its bottom rail (not shown) in the course of the lengthwise displacement of the motor vehicle seat by latching cams for example. Latching block 355 has recesses (FIGS. 23A and 23B) in which tensioning cable 318 is guided past the block to a tensioning spring 361 to which it is connected by a connector 362. Tensioning spring 362 keeps tensioning or locking cables 318 under tension when the seat is adjusted downward. On the other side of latching block 355, tensioning cables 318 are connected to a belt tightener 363, not shown in greater detail, which according to the invention includes at least one drive device 309 for tightening a seat belt (not shown) by retracting a belt buckle (not shown) in case of an accident.

If, when a latching block 355 is used, an even longer length is supposed to be available for drive devices 309 of a belt tightener or other safety device for example, then the design according to FIGS. 24A and B is advantageous. In this version, top rail 312 consists of a lower rail part 364 that contains latching block 355 of any desired length, and a top part 365 that is designed in the form of a tube to receive drive devices 309. As is particularly evident from FIG. 24A, the path of tensioning cable 318 from piston 312 to tensioning spring 361 is not impeded by latching block 355. Tensioning spring 361 is connected directly with cable thimble 350 or thickening 355 at cable end 319.

Piston 312 and guide 329 are made in one piece with tear-off point 354 therebetween. To entrain tensioning cable 318 with piston 312 when it is urged by power-storing devices 306 and 307, a clamping wedge 359 is contained in piston 312 in the manner already explained above. Power-storing device 306 is ignited electrically by leads 311 and power-storing device 307 is ignited mechanically by ignition strip 315. To connect bottom rail part 364 with top part 365, in the embodiment under discussion here, a mount 366 is provided that surrounds top part 365 at least in one end area and contains tabs 367 that are permanently connected by rivets 353 with a bottom rail part 364. At the end of top part 365 opposite mount 366, the latter can simply be inserted into bottom rail part 364 alone.

In the design shown in FIGS. 24A and 24B, by contrast with the versions shown in FIGS. 21A–C and 22A–C, it should be noted that the position of first power-storing device 306 is different and a roller 326 is used inside guide 329 to allow the cable to move more easily by improving the slip.

The sequential and stacked design could also be combined. In all of the solutions described previously, top rails 145 can be reduced structurally, in other words when used in conjunction with a belt tightener the buckle side that is subjected to the highest load can be reinforced accordingly by the structure of the tensioning tube. By using solutions with a plurality of power-storing devices, the tightening power can be doubled for example, thus reducing injuries by 25% and reducing stresses on vehicle occupants, test dummies, and seats, permitting savings in the seat structure.

The individual skilled in the art has no difficulty in combining features of the individual embodiments described above and/or modifying them within the framework of the general disclosure in these documents.

Hence the motor vehicle seat according to the invention permits savings in space requirements, weight, and cost. By using a plurality of energy-storing devices for example, increased power can be provided for the desired safety functions. For example, taking advantage of the possibility of mounting the belt buckle, even in height-adjustable or tiltable seats, on the seat part, especially at the same generally constant height, is especially comfortable. In addition, as a result of the permanent connection for example of the belt tightener, or tightener for short, or generally of at least one drive device in the seat rail, in other words more precisely the top rail, an improvement with respect to seat structure and tilting, called submarining, is achieved.

Another possibility for improving all of the designs with mechanical igniters consists of the fact that the cartridge of the power-storing device has two mechanically triggerable igniters that are urged jointly but preferably independently of one another. In rim fire cartridges, this can be accomplished for example by providing two or more ignition strips each of which has an ignition nose at the corresponding position. Ignition is triggered at least by one ignition nose or generally by one igniter as a result of the relative movement between the ignition strips with their ignition noses on the one hand and the cartridges with their ignition devices on the other. The improvement functions similarly in tear-off igniters. In addition, the improvement can also be applied to cartridges with mechanically triggerable ignition inserts such as percussion caps which are ignited by being struck by or hitting a firing pin. In this type of igniter as well, redundancy can be provided by two ignition inserts per cartridge. One firing pin is provided per ignition insert which, when triggered, causes ignition so that at least one combination of firing pin and ignition/insert ignites the cartridge. Under certain conditions, two different types of ignition can be combined.

The important advantage of the above improvement is that increased safety is obtained because the power-storing device, such as a cartridge, is triggered mechanically. In electrically triggered power-storing devices, in other words, those that are ignited, there is a 99.999999 probability that ignition will be successful. In power-storing devices with mechanically triggered ignition, this probability on the other hand is only 99.9999. However, if according to the improvement described above, two mechanical ignition provisions are used that are triggered simultaneously but preferably independently of one another, the probability that a power-storing device thus equipped will be triggered mechanically is even greater than the probability that an electrical ignition will succeed.

The double ignition described above can be used in any safety device that is actuated by power-storing devices, and is not limited to the devices described in these documents in conjunction with a motor vehicle seat. Thus, such double ignition can also be used in power-storing devices to be ignited mechanically, for example those of a driver or passenger airbag accommodated in the steering wheel or in the dashboard. In addition, such double ignitions can also be used for safety devices such as side airbags, steering column retractors, rear seat airbags, belt tighteners, headrest triggers, and seat surface/seat surface ramp adjustments, etc. In particular, this improvement can also be used in all safety devices that are disclosed in German Patent Applications DE 196 04 155.8, DE 196 32 222.7, DE 196 41 224.2, DE 197 03 945.6, DE 197 07 998.9, DE 197 09 257.8, DE 197 12 782.7, DE 197 15 463.8, and DE 197 26, 878.1, with the disclosure content of these patent applications being incorporated completely in the present documents by reference. The mechanical double ignition that can be used advantageously in the motor vehicle seats which are the major item under discussion in the present documents is therefore of independent inventive significance.

FIGS. 25, 26A–C, 27B, and 28A, 28B show embodiments of mechanical double ignitions that are described below.

Figure 25:
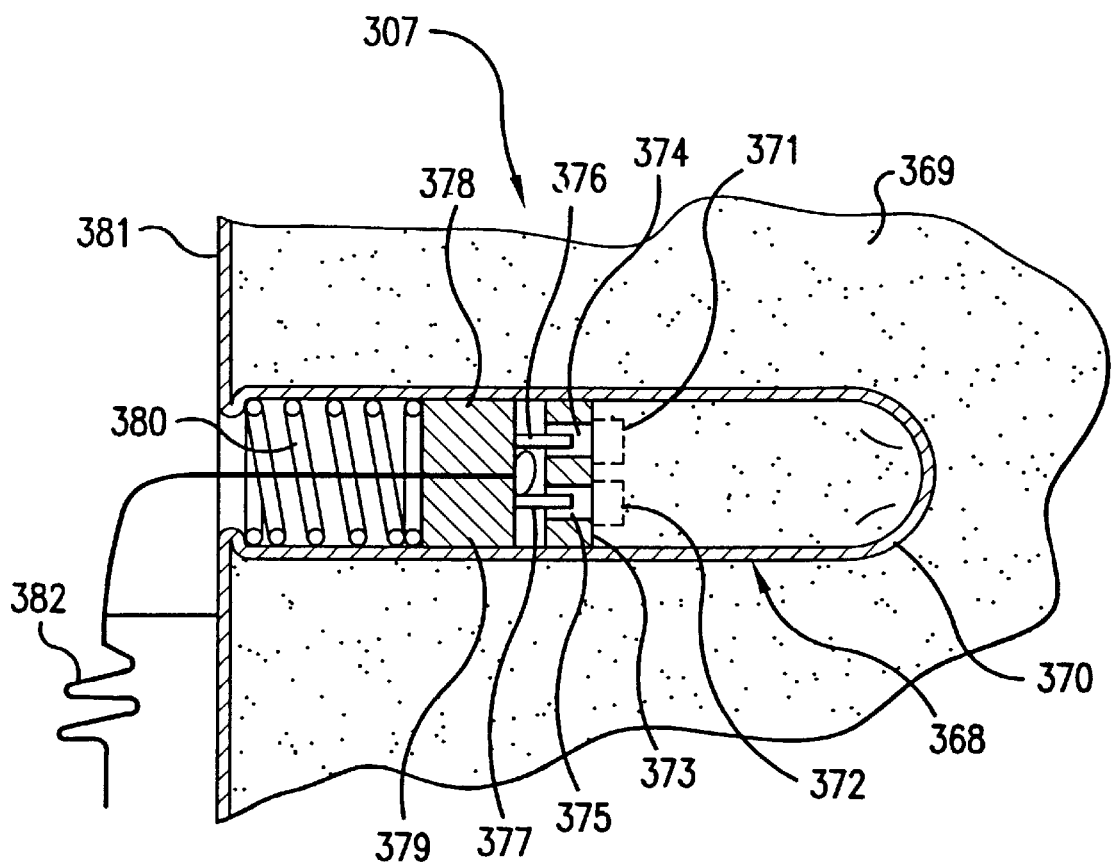
FIG. 25 shows a first embodiment of a power-storing device with mechanical double ignition for triggering safety devices, especially of a motor vehicle seat.

FIG. 25 shows a cross section of a power-storing device 307 for mechanical triggering of a second stage of a belt tightener drive. Power-storing device 307 contains a cartridge 368 and a generator 369 that receives the latter, said generator being ignitable by cartridge 368. Cartridge 368 contains a casing 370 and two igniters 371, 372 on whose side facing away from casing 370 a cover 373 rests, in which cover one of two guide holes 374, 375 leads to one of igniters 371, 372. Firing pins 376, 377 project into guide holes 374, 375, respectively, but without touching igniters 371, 372. Firing pins 376, 377 in turn abut ignition pistons 378, 379 respectively which jointly but independently abut a compression spring 380 that is supported in housing 381 of generator 369, said housing being formed for example by an aluminum jacket. An ignition cable 382 is connected with the two ignition pistons 378, 379 in such fashion that when a pull is exerted on ignition cable 382, both ignition pistons 378, 379 are moved against the force of compression spring 380, in other words compression spring 380 is pretensioned thereby.

Ignition cable 382 is connected for example with a piston (not shown here) that is urged by the ignition of an electrically ignitable first power-storing device (not shown) and displaced thereby in such fashion that it is tensioned and finally torn off by the movement of the piston (not shown here). Since compression spring 380 is pretensioned when ignition cable 382 is tensioned, after ignition cable 382 tears free the compression spring pushes ignition pistons 378, igniters 371 igniters 371, 372. In the process, firing pins 376, 377 are accelerated in guide holes 374, 375 and strike igniters 371, 372. The fact that ignition pistons 378, 379, firing pins 376, 377, and guide holes 374, 375 as well as igniters 371, 372 are each provided in duplicate increases the probability of error-free triggering of the power-storing device to more than 99.999999 for error-free triggering of electrically ignited power-storing devices by comparison with a probability of 99.9999 for only one of these components being provided.

The two ignition pistons 378, 379 that are urged simultaneously but independently of one another ensure that even with dimensional tolerances of all the components involved in ignition, at least one firing pin 376, 377 strikes an igniter 371, 372. The reliability of this happening is further increased by guide holes 374, 375. Finally, redundancy operates through two igniters 371, 372 in the sense that it further increases the reliability of the triggering of power-storing devices 307 thus equipped, since the probability that both ignitions will fail is half as great as the probability that it will not function when only one igniter is available.

FIG. 25 also shows that ignition cable 382 is deflected relative to the direction of motion of ignition piston 378, 379. This can be included or omitted depending on the information about the device, such as a belt tightener, airbag, etc. and the conditions at the application site.

Figure 26A:
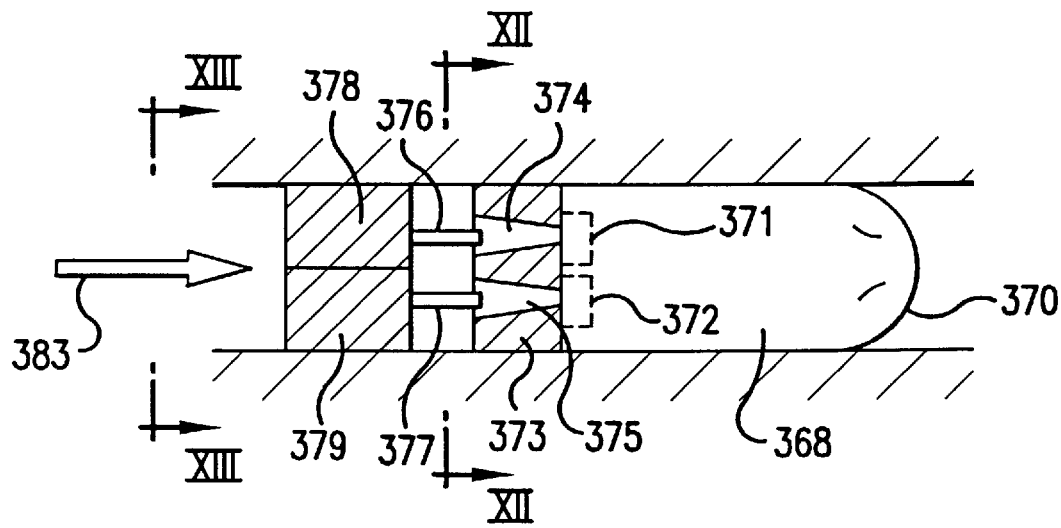
FIGS. 26A, 26B, and 26C show one lengthwise section and two cross sections through a second embodiment of a power-storing device with mechanical double ignition for triggering safety devices, especially of motor vehicle seats, with the cross sections in FIGS. 26B and 26C being made along lines XII—XII and XIII—XIII respectively in FIG. 26A.
Figure 26B:
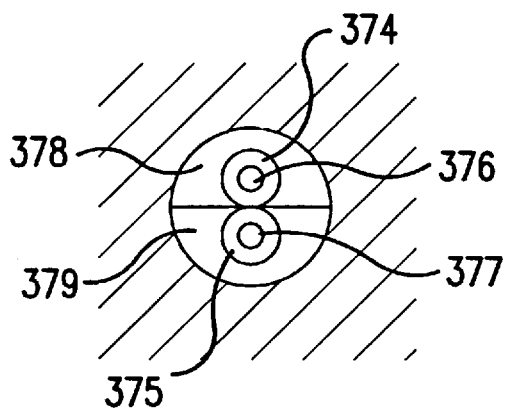
Figure 26C:
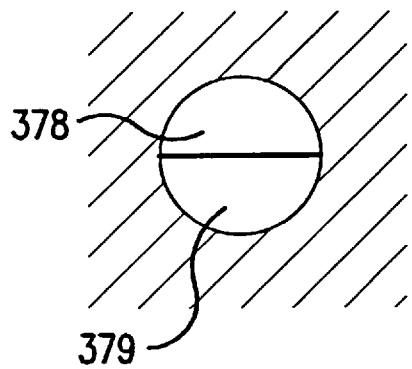

The additional embodiments shown in FIGS. 26A, 26B, 26C for double ignition of a second or additional stage of a drive devices, generally of a safety device shows, in addition to the version explained previously with reference to FIG. 25, that instead of the compression spring, any other force can urge the double ignition pistons composed of the two pistons 378, 379 in the direction of arrow 383, for example directly by a gas pressure pulse of a power-storing device triggered beforehand. One possible application can be provided for example in conjunction with pressure ignition for an airbag or a belt tightener with multistage drive following the second stage.

In addition, in the embodiment in FIGS. 26A–C, as well as the design in FIG. 25, cover 373 with guide holes 374, 375 for firing pins 376, 377 can be glued to the bottom of the casing, connected shapewise, or made integral.

Instead of an impact igniter or a percussion cap igniter, like igniters 371 and 372, a power-storing device can also contain a tear-off igniter or rim fire igniter, like those shown in FIGS. 27A, 27B and 28A, 28B.

Figure 27A:
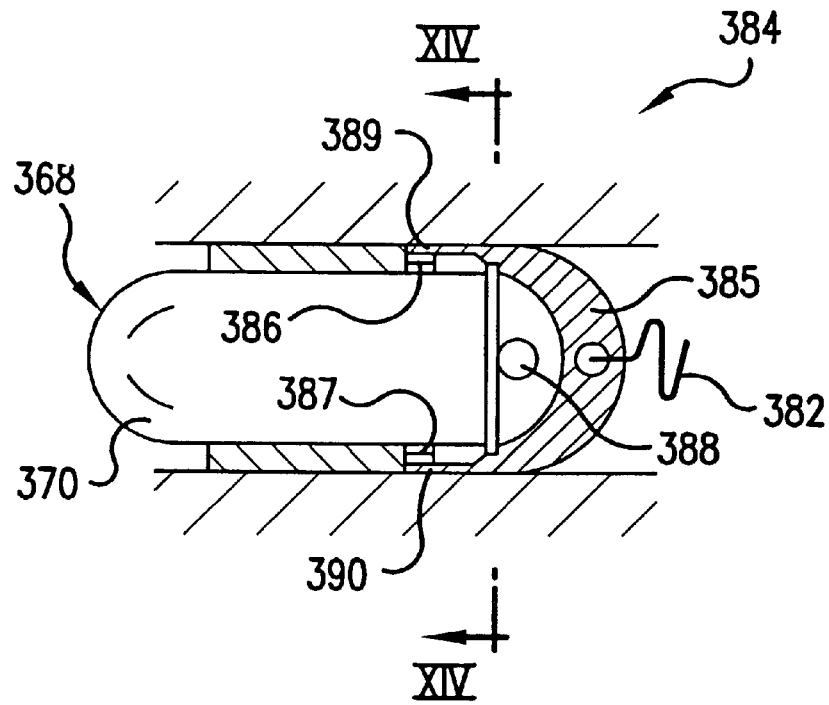
FIGS. 27A and 27B show a lengthwise section and a cross section, respectively, through a third embodiment of a power-storing device with mechanical double ignition for triggering safety devices, especially of a motor vehicle seat, with the cross section in FIG. 27B being made along line XIV—XIV in FIG. 27A.
Figure 27B:
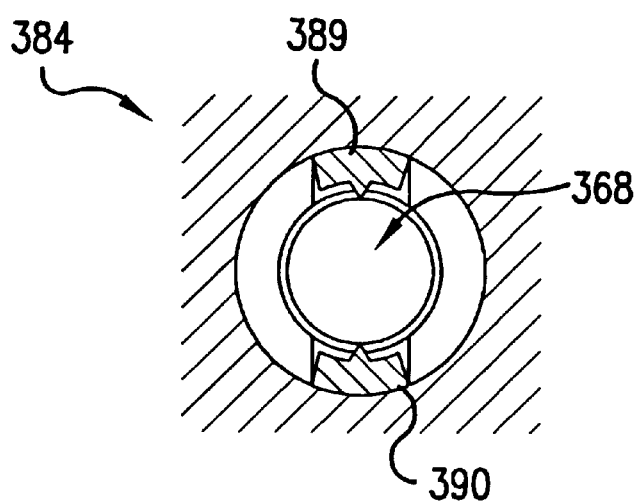

In the rim fire tear-off igniter 84 shown in FIGS. 27A and 27B, a bridge 385 with two ignition noses 386, 387 is provided. As in the example in FIG. 13, bridge 385 is urged by means of an ignition cable 382, fastened for example to a piston (not shown), ensuring that the two ignition noses 386, 387 rub on the outside wall of casing 370, causing cartridge 368 to ignite. Cartridge 368 is prevented from slipping through by a retaining pin 388. Ignition noses 386, 387 are located on bridge legs 389, 390, with it being possible to provide a plurality of ignition noses, for example two ignition noses per bridge leg 389, 390 instead of one ignition nose 386 or 387 on each bridge leg 389 or 390. One possible application consists in an airbag (not shown) being triggered by means of an electrically triggered first power-storing stage and with the second stage, in other words second power-storing device 307 with two ignition noses 386 and 387 on bridge 385, being triggered by a fuze or ignition cable 382.

Figure 28A:
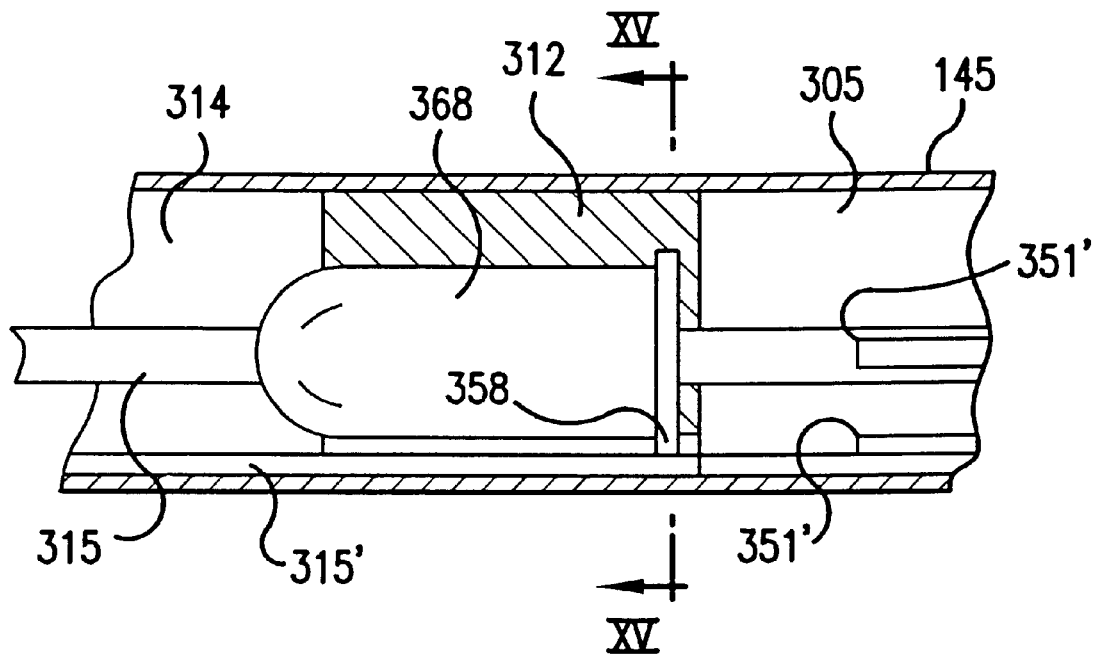
FIGS. 28A and 28B show a lengthwise section and a cross section, respectively, through a fourth embodiment of a power-storing device with mechanical double ignition for triggering safety devices especially of a motor vehicle seat, with the cross section in FIG. 28B being made along line XV—XV in FIG. 28A.
Figure 28B:
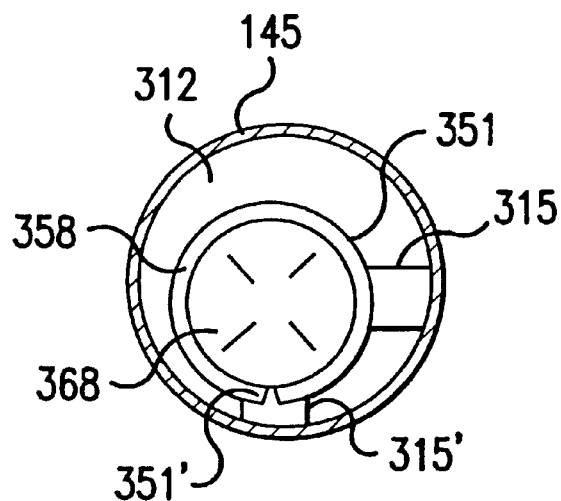

Mechanical triggering by a gas pressure pulse caused by ignition of a previously triggered power-storing device for urging drive devices of safety devices is used in the embodiment shown in FIGS. 28A and 28B. A rim fire ignition cartridge 368 is used as the cartridge that is ignited when a part of its cartridge edge 358 is knocked off. This is accomplished when piston 312, in which cartridge 368 rests, is accelerated by a first power-storing stage along two ignition strips 315, 315', on which an ignition nose 351 or 315' rests. When cartridge edge 358 strikes the two ignition noses 351, 315', the probability is twice as great that one of the ignition noses 351, 315' will ignite the cartridge than if only one ignition nose 351 or 315' were present. This version can be used for example in drive devices 309 of a belt tightener (not shown) in order to increase the reliability of mechanically triggered ignition by double ignition to the level of at least 99.999999 that is achieved with electrical ignition and is required by some applicants in the automobile industry, by comparison with conventional single ignition with its reliability of 99.9999. Double ignition can be implemented according to the invention by at least largely simultaneous ignition at two points: rim fire igniters, tear-off igniters, or two igniters (drive igniters, percussion caps) according to the invention.

If no mechanical ignition or no mechanical double ignition is to be used at all, in addition to a first stage, additional stages can likewise be ignited electrically. Solely for the reason of providing an example, reference is made here to the diagrams in FIGS. 29A and 29B in which a variation on the embodiment shown in FIGS. 24A and 24B is pictured. In FIGS. 29A and 29B and the specification related thereto, for reasons of simplification and legibility, only those parts are marked and discussed in which this design differs from that in FIGS. 24A and 24B. From a comparison of FIGS. 29A and 29B with FIGS. 24A and 24B and the other figures as well, especially in conjunction with the description of the latter, all the other features of the embodiment would be readily apparent to the individual skilled in the art.

As can be clearly seen in FIG. 29A, power-storing devices 306 and 307 are formed by a single two-stage cartridge 391, which releases its pressure pulse, triggered by electrical ignition, through line 311 into pressure-receiving chamber 314, located primarily inside piston 312. The latter is advantageously chosen accordingly, especially by comparison to the version according to FIGS. 24A and 24B, in order, despite the fact that two-stage cartridge 391 is longer than the version in FIGS. 24A and 24B, to retain the same structural length of the drive device/power-storing device according to FIGS. 29A and 29B. Cartridge 391 contains a first charge 392 which is electrically ignited when the associated safety device, such as a belt tightener, is triggered. First charge 392 is abutted by a delay unit which is started by the triggering of first charge 392 and chemically produces a time delay until a first charge 393 is ignited, which then likewise delivers its pressure pulse into pressure-receiving chamber 314. In this way, for example, a two-stage drive for piston 312 can be achieved even without mechanical components in the power-storing devices or their ignitions.

In addition to the embodiments shown in FIGS. 29A and 29B, there are numerous other possibilities for igniting the second and subsequent stages electrically, with corresponding cartridges being accommodated in or next to the top rail. Electrically ignitable cartridges can be accommodated In the piston itself as well. Triggering of later stages can also depend on the movement path of the piston in electrical ignitions, using appropriate position detectors, or can be controlled as a function of time, with electrical, electronic, or even mechanical devices being suitable in addition to the chemical time delay substances described in the embodiment above for allowing a predetermined space of time to elapse between the ignitions of successive power-storing devices or power-storing stages.

An electrical ignition has a reliability of 99.999999 that the ignition will be triggered in a problem-free manner. This is due primarily to the probability that a single mechanical ignition will function in an error-free manner but is also less than the probability that can be achieved with a mechanical double ignition. The reliability that can be achieved with electrical ignitions, depending on the application and the area, may be completely sufficient however.

Figure 30A:
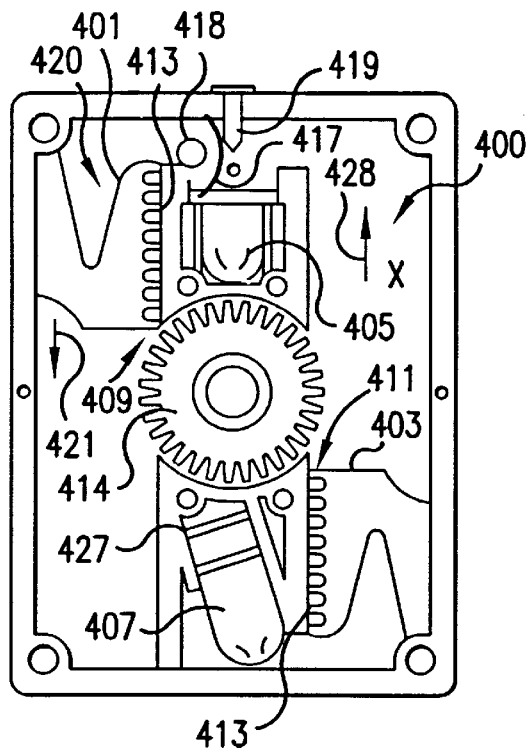
Figure 30B:
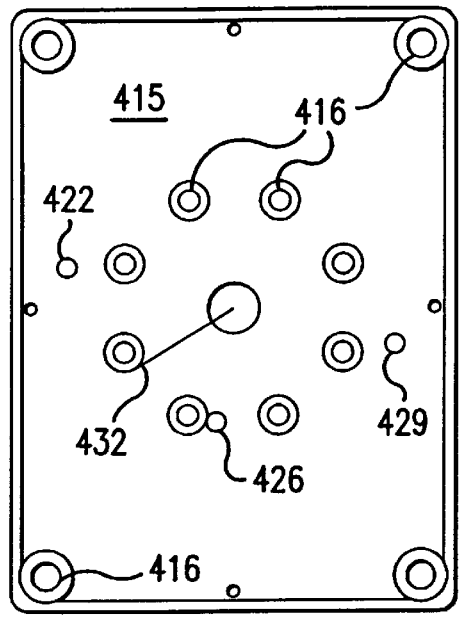
Figure 30C:
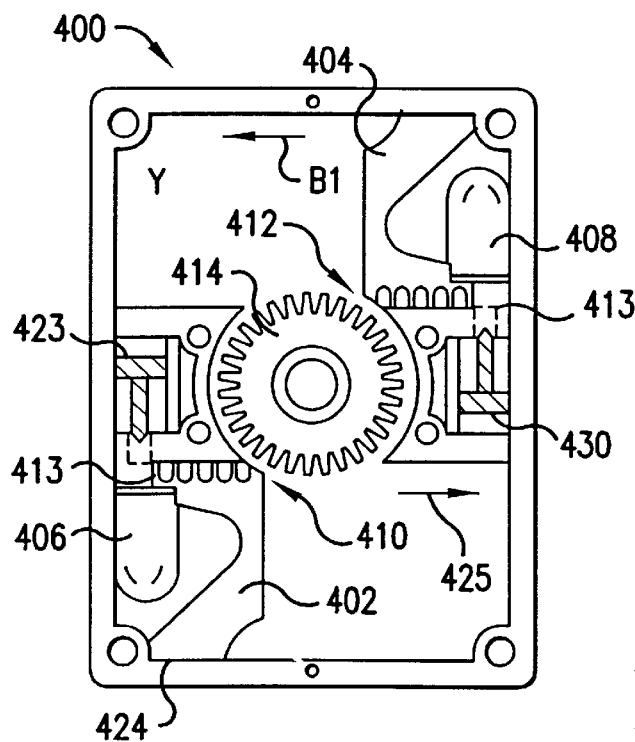
Figure 30D:
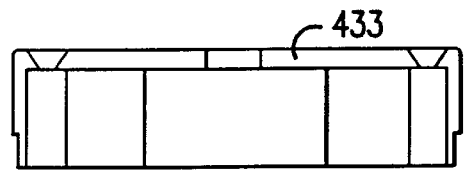
Figure 30E:
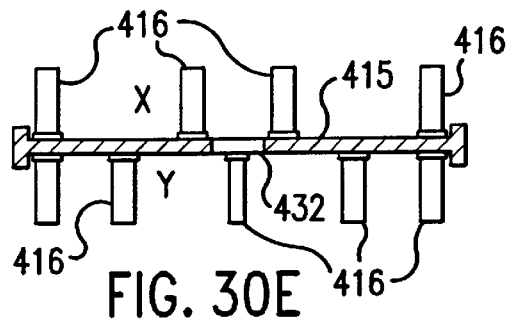
Figure 30F:
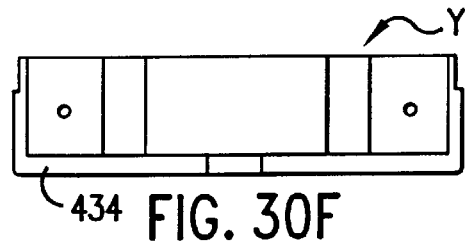

FIGS. 30A to F show various internal and external views of another embodiment of a drive device, a belt tightener for example. Specifically, FIGS. 30A and 30C are top views of an intermediate plate with drive components mounted thereon, and FIGS. 30B and 30E show a top view and a cross section through the intermediate plate without drive components, while FIGS. 30D and 30F show side views of housing halves of the drive device.

The drive device 400 shown here contains four pistons 401, 402, 403, and 404, with one cartridge 405, 406, 407, or 408 being provided to drive each of them. In addition, each of pistons 401, 402, 403, and 404 has a rack side 409, 410, 411, and 412 with teeth 413 designed to engage a central gear 414 when pistons 401, 402, 403, and 404 are urged by their respective cartridges 405, 406, 407, and 408. The drive device 400 shown is a four-piston rack automatic seat belt tightener, with central gear 414 engaging a belt retractor (not shown).

As can be seen especially from FIG. 30E, pistons 401 and 403 lie on a common plane X and pistons 402 and 404 likewise lie on a common plane Y parallel to plane X of pistons 401 and 403, and are separated by an intermediate plate 415. Rivets or screws 416 project from intermediate plate 415, said rivets or screws securing individual components of drive device 400 and determining the space allowed for movement for the various pistons 401, 402, 403, and 404.

In terms of function, the present design provides multiple pressure ignition. First cartridge 405 can be triggered electrically for example. However it is also possible to provide for mechanical ignition of this first cartridge 405 as shown in FIG. 30A. For this purpose, a weight 418 is coupled to a leaf spring 417 pretensioned into a top dead center position, said weight, upon sufficiently high acceleration like that produced for example by an impact in an accident, causing leaf spring 417 to bend by virtue of its inertia, so that cartridge 405 that is held in a pretensioned position is released and strikes with its igniter (not shown) against a firing pin 419, triggering cartridge 405.

The resultant compressed gas initially fills pressure chamber 420 of first piston 401 so that this piston is urged and moved in the direction of arrow 421. During this movement, teeth 413 of rack side 409 of first piston 401 mesh with gear 414, causing the latter to turn. In the course of its movement (arrow 421), first piston 401 exposes a pressure hole 422 in intermediate plate 415, through which hole the compressed gas can escape from cartridge 405, from plane X of first piston 401 into plane Y of piston 402, 404. The compressed gas that abruptly enters plane Y impacts a firing pin 423 which in turn triggers the second cartridge 406. This produces compressed gas in a pressure chamber 424 and thus urges second piston 402 which is moved as a result in the direction of arrow 425. As a result of this movement, teeth 413 of its rack side 410 mesh with gear 413 and turn the latter, and in the course of the movement of second piston 402 the latter exposes a pressure hole 426 in intermediate plate 415, through which compressed gas can escape from second cartridge 406, from plane Y into plane X.

The compressed gas flowing through pressure hole 426 in intermediate plate 415 to plane X from second cartridge 406 urges a firing pin 427, causing the latter to trigger third cartridge 407. The resultant compressed gas causes third piston 403 to move in the direction of arrow 428, whereupon teeth 413 of rack side 411 of third piston 403 mesh with gear 414 and move the latter further. In addition, the compressed gas from third cartridge 407, following a predetermined travel of third piston 403, can escape plane X through this exposed pressure hole 429 and escape into plane Y. This causes an impact on a firing pin or striker pin 430, thus triggering fourth cartridge 408. The compressed gas that results moves fourth piston 404 in the direction of arrow 431 and, by the meshing of teeth 413 of rack side 412 with gear 414, advances the latter. For the sake of completeness, it should also be mentioned here that a through bore 432 is provided in intermediate plate 415, in which bore gear 414 is mounted. Finally, FIGS. 30D and 30F show two housing halves 433 and 434 that receive intermediate plate 415 with all of the components mounted thereon.

The design in FIGS. 30A to F of course can also include a return lock so that gear 415 cannot turn backward when a corresponding force is acting on the connected shaft (not shown) of the belt retractor (not shown) or an automatic shaft in general (not shown). Instead of the four stages, a drive device of this kind can include fewer or more stages that are all in a common plane or are divided into more than two planes. As a result of the division of a necessary linear movement path in the case of only one piston for driving the gear, in order for the latter to have a sufficient rotary movement for tightening a seat belt for example, provision is made as the core of this design that this movement path is divided for example into partial movement paths that are compartmentalized, permitting a more compact design. In addition, this concept is not limited to pressure ignition, but rim fire cartridges and others can be used, with a piston triggering the rim fire cartridge of the next stage directly by its movement for example.

Figure 31A:
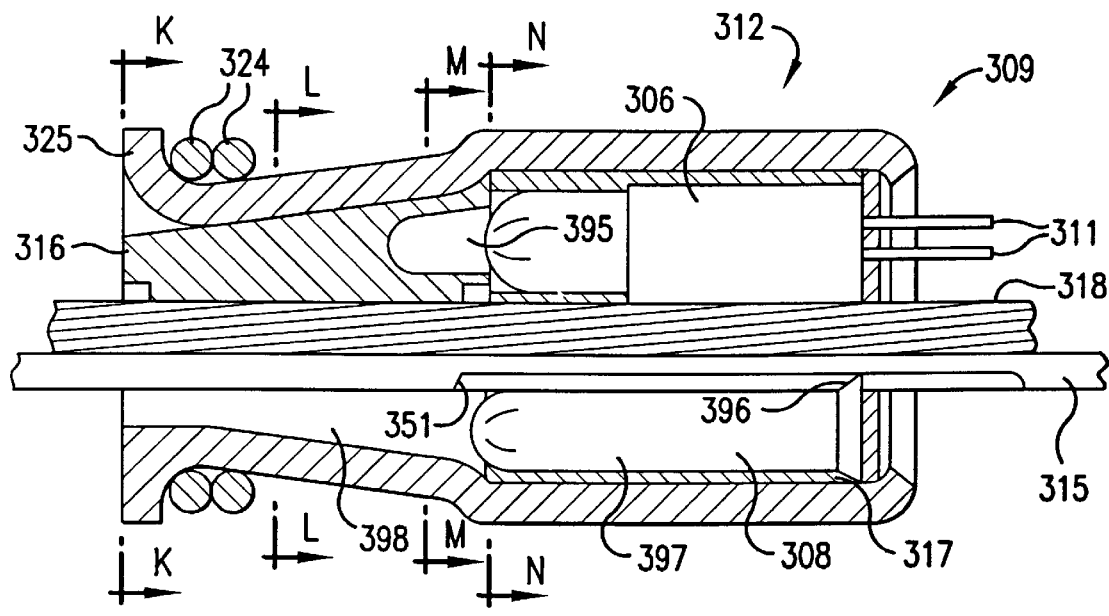
FIGS. 31A to E show one lengthwise section (FIG. 31A), and four cross sections (FIG. 31B, section K.
Figure 31B:
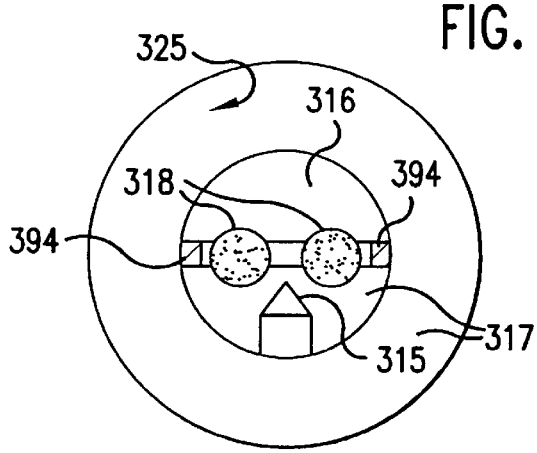
Figure 31C:
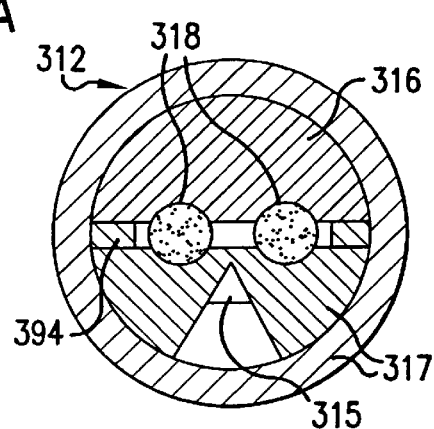
Figure 31D:
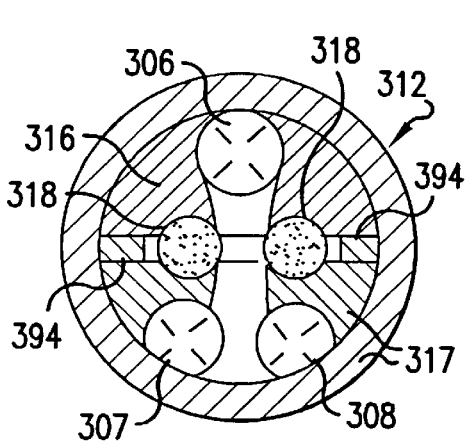
Figure 31E:
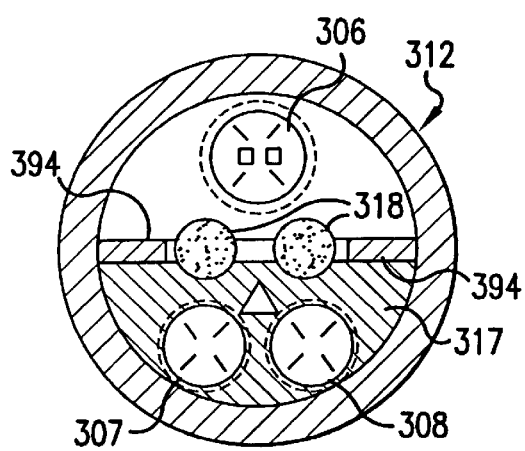

FIGS. 31A to E show one lengthwise section (FIG. 31A) and four cross sections (FIG. 31B, section K; FIG. 31C, section L; FIG. 31B, section M; FIG. 31E, section N) through a clamping piston 312, as basically shown already in FIGS. 17A and 17B for example and described in connection therewith. Clamping piston 312 in FIGS. 31A to E is analogous to the one in FIGS. 17A and 17B, with the former (FIGS. 31A to E) being a round piston and the latter (FIGS. 17A and 17B) being a rectangular piston.

Tensioning devices such as a zigzag spring 394 ensure that piston part 316 is held at a distance from piston part 317 provided the drive device has not been triggered, so that tensioning cable 318 can be pushed freely between the two piston parts 316 and 317, thus allowing a seat height adjustment. Piston part 316 has a receiving chamber 395 into which the compressed gas generated by power-storing device 306 is released, said device in the present case being an electrically ignitable cartridge. The associated pressure pulse also ensures that wedge-shaped piston part 316 is displaced leftward in FIG. 31A. As a result, piston part 316, because of its wedge shape, in conjunction with the corresponding wedge design of piston part 317, is pressed against tensioning cable 318 and against the force of zigzag spring 394, so that tensioning cable 318 is forcibly clamped between the two piston parts 316 and 317, with piston part 316 then assuming a clamping position.

As a result of the displacement of piston part 316 inside piston part 317 into the clamping position, a pressure channel (not shown; see by analogy FIG. 17A, pressure channel 313) is exposed, through which channel the compressed gas can pass from the cartridge of power-storing device 306 into a receiving chamber 314 (see FIG. 17A) and develop a pressure therein for urging the entire piston 312. The latter is caused to move as a result (rightward in FIG. 31A), entraining tensioning cable 318 clamped between piston parts 316 and 317, to which cable a belt buckle (not shown) is connected for example and is retracted thereby. After piston 312, powered by the compressed gas from power-storing device 306, has traveled a predetermined distance, ignition nose 351 comes in contact at ignition strip 315 with one edge 396 of a rim fire cartridge 397, with the latter being ignited as the second stage of drive device 309. Rim fire cartridge 397 in the present case is a second power-storage device 308 that releases its compressed gas into a compressed gas discharge channel 398 and as a result drives piston 312 further forward, taking tensioning cable 318 with it. In this manner, a third power-storing device 307 can be ignited, for example in the form of a rim fire cartridge, and provides a further push to piston 312 as the third stage. Thus piston 312 shown in FIGS. 31A to E is a clamping piston driven in three stages, or in other words a piston with a pyrotechnic cable-entrainment coupling and path-controlled triple ignition, which also has a return lock with clamping balls 324. In this regard and in general, as far as the components shown in FIGS. 31A to E and their functions are concerned, reference will be made in particular to the description of FIGS. 17A and B to avoid repetition. Further details follow from the comparison of reference numbers and FIGS. 31A to E of the drawing with the other figures of the drawing.

Only for the sake of completeness will it now be mentioned that in some embodiments the drive device is provided in a seat rail, but this need not be the case. Basically, the derive device according to the invention can also be mounted crosswise to the direction of travel of the vehicle thus equipped, beneath or in a seat, or in the travel direction, mounted laterally on a seat rail, or accommodated in some other way in the vehicle.

The above features and combinations of features, shown above and in the drawings, of all the embodiments discussed serve only as examples to illustrate the invention and not to limit it. The scope of disclosure of the entire present document is determined by what is clear to the individual skilled in the art, not only from the claims but also from the specification and the drawing, including in particular the complete contents of DE 197 07 998.9.

I claim:

1. Drive device for moving components in a motor vehicle, especially for tightening a seat belt, comprising:
   a piston movable along a path of linear movement; and
   a piston drive guiding the piston linearly in a pressure tube and including a plurality of sequentially arranged ignitable pyrotechnic piston drive means for driving said piston;
   wherein, along the path of linear movement of the piston driven by an initial ignition, subsequent ignitions are triggered for successively ignitable piston drive means.

2. Drive device according to claim 1, wherein successive ignition of the piston drive means is accomplished by multistage power-storing devices and/or ignition devices or by a plurality of power-storing devices and/or ignition devices.

3. Drive device according to claim 2, wherein successive triggerings of individual stages are controlled chemically, mechanically, and/or electrically.

4. Drive device according to claim 1, wherein, as a result of the linear movement of the piston driven by the initial ignition, subsequent ignitions are triggered for the successively ignitable piston drive means.

5. Drive device according to claim 4, wherein pressure channels are exposed as a result of the linear movement of the piston through which pressure channels the subsequent ignitions of the drive means by pressure cylinders impacted by a driving force can be triggered.

6. Drive device according to claim 4, wherein a mechanical triggering device that moves together with the piston triggers the subsequent ignitions mechanically.

7. Drive device according to claim 1, wherein the initial ignition is triggered electrically or mechanically.

8. Drive device according to claim 1, wherein said piston is one of a single piston driven in the pressure tube or one of two pistons driven in opposite directions in the pressure tube.

9. Drive device according to claim 8, and further comprising tensioning means fastened to the piston and/or to the two pistons for interconnection with components of a seat belt retractor system.

10. Drive device according to claim 8, wherein the respective pistons are guided in a working channel that forms the interior of the pressure tube, and pyrotechnic drive means are located in a plurality of additional chambers whose pressure chambers, in which the respectively ignited propellant acts, are connected with the pressure sides of the pistons.

11. Drive device according to claim 10, wherein pressure chambers of propellants ignited by the subsequent ignitions can be connected by the linear movement of the respective pistons with the piston pressure sides in working chamber.

12. Drive device according to claim 8, and further comprising return locks engaging the respective pistons.

13. Drive device according to claim 12, wherein respective return locks are provided externally in a vicinity of the driven component.

14. Drive device according to claim 9, wherein the individual pistons are connected directly with a retaining device on which a belt buckle of the seat belt is mounted and in that retaining device and belt buckle are essentially moved in the direction of movement of piston when the belt is tightened.

15. Drive device according to claim 1, and further comprising at least one additional shaft parallel to each working chamber of the pressure tube, said shaft containing receiving chambers for pyrotechnic propellant.

16. Drive device according to claim 1, wherein said pressure tube is designed as an extrusion-molded section.

17. Drive device according to claim 15, wherein at least two parallel working chambers are provided for piston drives.

18. Drive device according to claim 15, wherein drive means are provided for at least two working chambers in a single additional shaft running parallel thereto.

19. Drive device according to claim 15, wherein four drive chambers are provided.

20. Drive device according to claim 8, wherein, in the drive with two pistons in respective pressure tubes, a drive element is provided in each piston, with the drive element of the first piston being electrically ignitable and the drive element of the second piston being ignitable by the pressure urging the first piston.

21. Drive device according to claim 17, wherein the system with two or more parallel working chambers and piston drives guided therein form a central energy device by which a plurality of components connected to the piston drive in the vehicle can be moved.

22. Drive device according to claim 1, wherein the component to be moved on piston drive is connected by Bowden cables.

23. Drive device according to claim 22, wherein a Bowden cable is connected by compressing cable in a tubular retaining device for the component, especially for belt buckle, and that tubular retaining device can be guided in a tubular guide device during the driving movement.

24. Drive device according to claim 22, and further comprising a return lock provided on a part of a tubular retaining device located at one end of guide device.

25. Drive device according to claim 24, wherein the return lock is formed by a conical surface molded on the tubular retaining device and by at least one clamping body provided between the conical surface and the inside wall of a tubular guide device.

26. Drive device according to one of claim 25, and further comprising stops molded on a tubular section of the retaining device inserted into the tubular guide device, surrounding and delimiting the conical surface.

27. Drive device according to claim 1, wherein the part to be moved on a piston drive is connected by webbing.

28. Drive device according to claim 27, wherein, outside the piston drive, a return brake designed as a clamping device or a return lock is mounted on vehicle body.

29. Drive device according to claim 28, wherein said clamping device forms an end stop for a seat belt of a seat belt system during normal operation.

30. Drive device according to claim 28, wherein the clamping device has two clamping elements mounted on the vehicle body, said elements being in frictional connection with a seat belt in their end-stop function, with the frictional connection being released during tightening operation and with the frictional connection being restored during the return locking function.

31. Drive device according to claim 1, and further comprising a coupling for connecting a rotating component, especially a winding shaft of a seat belt retractor, one of whose coupling elements is connected with tensioning cable and the other coupling element is connected with winding shaft.

32. Drive device according to claim 31, wherein the coupling elements have an inner toothed ring permanently connected with winding shaft and an outer toothed ring permanently connected with tensioning cable, with an outer coupling element being attached to the belt retractor during normal operation by fixing means that are released at the beginning of the tightening movement transmitted by tensioning cable.

33. Drive device according to claim 32, wherein the outer coupling element has a larger diameter than internal coupling element, so that coupling elements are kept from engaging during normal operation by locking means and in that when the tightening movement is communicated to winding shaft, the teeth of the toothed rings of the coupling elements are kept engaged over a certain angular range.

34. Drive device according to claim 33, wherein the tooth engagement is maintained by tension exerted during tightening by a tensioning cable on outer coupling element.

35. Drive device according to claim 32, wherein the outer coupling element is mounted loosely on the inner coupling element after tightening.

36. Drive device according to claim 1, wherein at least one power-storing device and/or at least one drive device is/are accommodated inside a top rail of a motor vehicle seat.

37. Drive device according to claim 36, wherein two preferably opposite driving devices are accommodated inside a top rail and can be urged by at least one common power-storing device.

38. Drive device according to claim 36, wherein the top rail has an inner chamber or inner chamber section that is at least approximately rectangular or angular in cross section or is at least approximately round or oval, for receiving the at least one power-storing device and/or at least one drive device.

39. Drive device according to one of claim 38, wherein the at least one top rail is designed to be received partially and preferably completely inside a bottom rail mounted adjustably on the vehicle body.

40. Drive device according to claim 1, wherein said piston is one of several pistons.

41. Drive device according to claim 36, wherein a seat part is adjustable with respect to the top rail and in particular is height-adjustable or pivotable, and in that force and movement transmission devices, couplable after triggering with the at least one drive device, are provided for transmission of force and movement from at least one drive device to a safety device fixed with respect to the seat part, for example a belt buckle, a headrest, a forward edge of the seat part that can be raised, an operable cushion support in the vicinity of the front half of the seat part, and/or a seat back support.

42. Drive device according to claim 41, wherein the force and movement transmission devices contain tensioning devices, especially a tensioning cable, in that piston has several parts, with the tensioning devices being guided displaceably between piston parts provided that piston has not been urged by a power-storing device, and in that piston parts hold the tensioning devices initially at least forcewise and preferably also shapewise between them upon being urged by a power-storing device, accomplished in particular by applying pressure to a wedge-shaped piston part which consequently jams tensioning devices such as tensioning cables against second piston part.

43. Drive device according to claim 42, and further comprising pretensioning devices which urge tensioning devices toward a position that corresponds to the lowermost sitting position of the height-adjustable motor vehicle seat.

44. Drive device according to claim 42, wherein the power-storing device comprises an electrical ignition or a mechanical ignition.

45. Drive device according to claim 44, wherein the power storing device is one of a plurality of power-storing devices preferably with a first power-storing device comprising an especially electrical initial ignition as well as at least one additional power-storing device containing a preferably mechanical ignition, with two additional mechanically triggerable power-storing devices and devices for time-staggered triggering of the individual ignitions preferably being provided.

46. Drive device according to claim 41, wherein the at least one drive device is lockable in a triggered position by a return lock.

47. Drive device according to claim 46, and further comprising a clamping piston, at least one wedge, and/or a ball brake forming at least one component of the return lock for locking the at least one drive device.

48. Drive device according to claim 46, wherein the at least one drive device is lockable at least on one side with respect to its direction of movement.

49. Drive device according to claim 46, wherein the at least one drive device is lockable with respect to the corresponding top rail.

50. Drive device according to claim 1, and further comprising a seat-clamping device drivable by at least one drive device.

51. Drive device according to claim 1, and further comprising at least one power-storing device and/or at least one drive device and an insert received modulewise in top rail for accommodating the at least one power-storing device and/or the at least one drive device.

52. Drive device according to claim 51, wherein the at least one power-storing device has mechanical triggering and a redundancy such that two ignitions are triggered simultaneously but independently of one another.

53. Drive device according to claim 1, wherein a plurality of pistons is provided that can be urged in various directions, especially pairwise in different directions, and that pistons that can be urged in different directions are preferably movable in different, preferably parallel planes and are triggerable by the movement of a previously urged piston, and engage dispensing devices common to all the pistons, especially in the course of their movement.

* * * * *